United States Patent
Tripp

[15] 3,686,487
[45] Aug. 22, 1972

[54] TRIGONOMETRIC SIGNAL GENERATOR AND MACHINE CONTROL

[72] Inventor: Robert W. Tripp, Tuckahoe, N.Y.

[73] Assignee: Inductosyn Corporation, New York, N.Y.

[22] Filed: Oct. 6, 1969

[21] Appl. No.: 864,079

Related U.S. Application Data

[63] Continuation-in-part of Ser. No. 739,579, May 14, 1968, Continuation-in-part of Ser. No. 809,533, March 24, 1969.

[52] U.S. Cl. ............235/151.3, 318/603, 318/605, 235/92 MP
[51] Int. Cl. ............................................G06f 15/20
[58] Field of Search....................235/151.3, 154; 318/600–605, 685

[56] References Cited

UNITED STATES PATENTS

| | | |
|---|---|---|
| 3,175,138 | 3/1965 | Kilroy et al. ............318/605 X |
| 3,418,547 | 12/1968 | Dudler....................318/603 X |
| 3,439,336 | 4/1969 | Toifl et al. ............318/603 X |

*Primary Examiner*—Maynard R. Wilbur
*Assistant Examiner*—Charles D. Miller
*Attorney*—William E. Beatty and David E. Lovejoy

[57] ABSTRACT

Digital and analog converter method and apparatus for generating trigonometrically related signals suitable for use with position measuring and position controlling systems. Two or more converter analog output signals are formed as a function of the digital input. The digital input generates a digital count difference between the counts in two digital counters. The two counters are both stepped by synchronously derived stepping pulses to produce counter output signals, exhibiting a phase difference proportional to the digital count difference. The counter output signals are logically combined to form analog output signals. Those analog output signals are pulse-width modulated rectangular waveforms which each include a fundamental sinusoidal frequency component having an amplitude proportional to a trigonometric function of the digital input. The analog output signals from the converter are typically connected as inputs to a position measuring device to trigonometrically define the position between two members of the position measuring device. The position measuring device is typically an transducer or other data element which responsively forms an analog output signal having a magnitude which indicates the relative position of the two members. The analog output signal is typically converted to a digital signal, in the form of a train of pulses, where each pulse represents an incremental distance. That digital signal, derived from the analog output signal, is typically supplied as an input to the converter which converts the digital input to the analog output, thereby forming a closed loop system.

12 Claims, 28 Drawing Figures

Patented Aug. 22, 1972

3,686,487

INVENTOR
ROBERT W. TRIPP
BY David E. Lovejoy
W C Beatty ATTORNEYS.

INVENTOR
ROBERT W. TRIPP

INVENTOR
ROBERT W. TRIPP
BY
David E. Lovejoy
W.C. Beatty
ATTORNEYS.

TRIGONOMETRIC SIGNAL GENERATOR AND MACHINE CONTROL

This application is a continuation-in-part of application "Position Measuring System", Ser. No. 739,579, filed May 14, 1968, invented by R. W. Tripp, assigned to Inductosyn Corporation, and of application "Position Measuring System"Ser. No. 809,533, filed Mar. 24, 1969, invented by R. W. Tripp, assigned to Inductosyn Corporation.

CROSS REFERENCES TO RELATED CASES

1. "Position Measuring System", Ser. No. 739,579, now abandoned filed May 14, 1968, invented by R. W. Tripp, assigned to Inductosyn Corporation.
2. "Position Control System", Ser. No. 729,018, now abandoned filed May 14, 1968, invented by R. W. Tripp, assigned to Inductosyn Corporation.
3. "Position Measuring System", Ser. No. 809,533, now U.S. Pat. No. 3,609,320 filed Mar. 24, 1969, invented by R. W. Tripp, assigned to Inductosyn Corporation.
4. "Position Control System", Ser. No. 814,679, now U.S. Pat. No. 3,612,976 filed Apr. 9, 1969, invented by R. W. Tripp, assigned to Inductosyn Corporation.
5. "Digital-To-Analog Converter", Ser. No. 645,161, now U.S. Pat. No. 3,514,775 filed June 12, 1967, invented by R. W. Tripp, assigned to Inductosyn Corporation.
6. "Digital and Analog Converter", Ser. No. 854,816 filed Sept. 3, 1969, invented by R. W. Tripp, assigned to Inductosyn Corporation.

BACKGROUND OF THE INVENTION

1. Field of the Invention

This invention relates to the field of information conversion where information in the form of electrical signals is converted between digital and analog form. More particularly, the invention relates to information conversion suitable for use in servo systems where the rotational or translational position of a first member, with respect to a second member, is to be controlled or measured.

The apparatus of the present invention in its most basic form relates to converters for converting digital inputs to analog outputs. Additionally, the inventive apparatus relates to measuring systems wherein the position of one relatively movable member is measured with respect to another member and wherein an analog output is converted to a digital number indicating the relative position of the two members. Still further, the invention relates to control systems wherein a digital number is applied as a digital input to a converter, within a servo system, thereby causing a first relatively movable member to assume a selected position with respect to a second member where that selected position is a function of the digital input.

2. Prior Art

Prior art converter apparatus employing digital techniques useful in measuring or controlling the relative position of two members has generally employed one of two methods, namely, the amplitude method or the phase method. In the phase method, the ac output signals are generally of the same frequency and generally have equal amplitudes which are phase-shifted in time relative to each other. In a measuring or controlling system, the phase shift is proportional to the space relationship of one member with respect to the other member.

In the amplitude method, a converter generates two or more ac analog output signals of the same frequency, each having the same time phase but where each has a fundamental sinusoidal frequency component of varying amplitude. In a two-output-signal system, for example, two analog output signals are formed where one has a fundamental sinusoidal frequency component having an amplitude proportional to the sine and the other a fundamental sinusoidal frequency component having an amplitude proportional to the cosine of an angle. The amplitudes of these two output signals may be used to control or measure the rotational or translational position of one member, with respect to the other member, using data elements such as Inductosyns or other position measuring devices. Such a data element is described in U.S. Pat. No. 2,799,835 assigned to the same assignee as the present invention. The two or more analog converter output signals connected as inputs to the data element trigonometrically define a relative position of the members of a data element, both as to sign and magnitude, and the analog output error signal from the data element has a magnitude proportional to the displacement of the relatively movable members of the data element from that position.

Prior art apparatus employing the amplitude method includes that shown in U.S. Pat. Nos. 2,849,668 and 2,967,017, both assigned to the assignee of the present invention, and wherein tapped transformers are used to generate the output signals.

Other apparatus employing the amplitude method includes that disclosed in the above-identified application Ser. No. 645,161. In that invention, the apparatus employs the count-comparison technique and converts a digital number $n$ into a-c analog signals having amplitudes representative of trigonometric functions of an angle $\theta$ where $\theta = 360(n/N)$ degrees and where N divides a cyclic time interval into N equal parts. That apparatus generates two trains of pulses by comparing the count in an N-counter, cyclically stepped from 0 to N—1, with the count $n$ in an $n$-counter where $n$ has a value between 0 and N—1. The two pulse trains are summed or operate gating devices to provide rectangular wave signals having pulse-widths indicative of sin $\theta$ or cos $\theta$. In one embodiment, one train of pulses is generated upon identity of the contents of the N-counter and the contents of the $n$-counter, and the other train of pulses is generated upon identity of the contents of the N-counter and the output of a translator which forms the nine's complement of the $n$-counter contents.

The above-identified application, Ser. No. 645,161, and other similar prior art apparatus, employs the count-comparison technique to generate pulse-width modulated binary signals which have components which trigonometrically define position.

Although the prior art apparatus performs satisfactorily in many instances, it is desirable to simplify and reduce the cost of the apparatus for generating pulse-width modulated signals having components which trigonometrically define position. Additionally, it is desirable to provide circuitry, according to the present invention, which includes a flexibility which allows the use of count-comparison techniques, such as described in the above-identified application, Ser. No. 645,161, or, alternatively, which allows the use of simpler, more accurate, and less expensive techniques, also according to the present invention, for implementing the amplitude method.

SUMMARY OF THE INVENTION

In view of the above background of the invention, the present invention is a method and apparatus for converting a digital input to an analog output. Typically the digital input is derived (a) from an analog error signal of a data element when it is desired to measure the relative position of the members of the data element, or (b) from a command signal which controls a servo system including a data element when it is desired to relatively position the relatively movable members of the data element and any machine elements associated with the data element. The digital input generates a digital count difference between two counters. The two counters are stepped by synchronously derived stepping pulses to produce two phase-shifted, binary counter output signals where the relative phase-shift between the two signals is proportional to the digital count difference. The phase-shifted counter output signals are logically combined to form pulse-width modulated, binary output signals where those output signals exhibit analog values of pulse-width proportional to the digital count difference and where those output signals contain fundamental frequency components exhibiting analog values of amplitude proportional to a position defining trigonometric function of the digital input.

When the converters of the present invention are embodied in a system including a data element, the digital input is typically in the form of a train of pulses, frequently derived from an analog-to-digital converter, where the number of pulses equals the digital input. Each pulse in that train of pulses is typically representative of an increment of distance actually travelled (in the case of a measurement) or distance to be travelled (in the case of a command). The frequency of the pulses in the pulse train is representative of the speed with which the relatively movable members of the data element travel.

The term "amplitude" for the purposes of the present invention is defined to be the maximum magnitude of a signal proportional to a trigonometric function, T, where for one typical trigonometric function, sin $\phi$, T is expressed as $T = A \sin \phi$. In that typical example, the amplitude is A. The signal proportional to T is amplitude modulated, and ore specifically in the typical example, is modulated by sin $\phi$. The angle $\phi$ is typically any angle such as the angle $\theta$ defined hereinafter.

More particularly, the present invention is a method and apparatus for converting a digital number $n$ to output signals, where each output signal includes a sinusoidal frequency component of frequency, F, having an amplitude related to $n$ where that frequency component has a time period 1/F divided into N increments where each increment is 1/NF in duration. Further, the invention includes apparatus for generating output signals, each including a frequency component having an amplitude proportional to a sinusoidal function of a different constant angle plus an angle $\theta$ where $\theta$ equals $360(n/N)$ degrees. In accordance with the invention, a count range from 0 to M−1 is cyclically repeated in a first and in a second counter where M is any integer generally equal to or less than N. The two counters are continuously stepped through each count of the range from 0 to M−1 by stepping pulses of frequency MF synchronously derived from a source of pulses to frequency NF. Each time the counters have been stepped through M counts, they are reset and are stepped through another M counts. The source of pulses of frequency NF is conveniently divided by a factor L to derive the pulses of frequency MF where L times M equals N.

In addition to the two counters and the source, the apparatus of the present invention includes generation means for generating a difference in count between the counts in the two counters. The difference in count may be established in many ways by generation means of various forms to be described hereinafter. The outputs from the counters are two rectangular wave signals, one from each counter, of frequency F. The two counter output signals are phase-shifted with respect to each other by an amount proportional to the difference in count between the counts in the two counters. The generation means generally includes means, such as an L-count counter, for dividing the source signal by L.

Besides the generation means, the source and the two counters, the present invention includes logical combining means for logically combining the two phase-shifted counter output signals to form converter analog output signals each including a sinusoidal frequency component having an amplitude proportional to a trigonometric function of the difference in count between the counts in the two counters. In one preferred embodiment, the difference in count between the counts in the first and second counters is equal to 2n and the value selected for M is N/2 so that the value of $n/N$ is dynamically maintained. With the values indicated, the amplitude of each sinusoidal frequency component is proportional to a different constant angle plus the angle $\theta$ where $\theta$ equals 360 $(n/N)$ degrees. In one embodiment, the logical combining means includes a logical AND gate for forming the AND function of the phase-shifted output signals of the first and second counters.

In addition to the generation means, the source, the two counters and the logical combining means, one aspect of the present invention includes a reference generation means which develops a reference signal having a constant phase with respect to the converter analog output signals so as to provide a reference for determining the sign of those output signals.

In one form of the present invention, the generation means may include an alteration means for altering the number of synchronously derived stepping pulses applied to one counter with respect to the number of synchronously derived stepping pulses applied to the other counter. For counters of N/2 stages being stepped by stepping pulses of frequency NF/2, each counter produces an output signal of frequency F. The counter output signals are phase-shifted with respect to each other by an amount equal to the difference in count between the counts in the two counters. One alteration means, as a species of the generation means, is described, by way of example, in connection with an inhibit embodiment of the present invention. Another alteration means, also a species of the generation means, is described in connection with a symmetrical embodiment of the present invention. Still another species of the generation means, is described in connection with a reset embodiment of the present invention. The reset embodiment is described, but not claimed, in the above-identified applications, Ser. No. 809,533 and Ser. No. 814,670, which are continuing applications from applications Ser. No. 739,579 and Ser. No. 729,018, respectively.

In the inhibit embodiment of the present invention, the generation means includes an alteration means which functions to alter the number of stepping pulses applied to one counter with respect to the number applied to the other counter by inhibiting stepping pulses of frequency NF/2 (letting M = N/2) from being applied to one or the other of the two counters. The inhibiting by the alteration means generates a count difference between the counts in the two counters. The difference in count creates a phase shift in the counter output signals and, when those phase-shifted counter output signals are logically combined, a pulse-width modulated signal is created where that pulse-width modulated signal has a fundamental frequency component, of frequency F, which exhibits an amplitude proportional to a sinusoidal function of the angle $\theta$ where $\theta$ equals 360 ($n/N$) degrees.

In the symmetrical embodiment of the present invention, the generation means includes an alteration means which effectively alters the number of stepping pulses applied to one counter with respect to the number of stepping pulses effectively applied to the other counter in a manner which is symmetrical with respect to a third counter called a reference counter. In this symmetrical embodiment, the reference counter is uniformly stepped by a source and the first and second counters are symmetrically incremented and decremented with respect to the reference counter. This symmetrical embodiment is, therefore, particularly useful in plural-axes servo systems since the uniformly stepped reference counter may be shared by each of the axes. The sharing of the reference counter, of course, is economically desirable in that it reduces the circuitry required while also assuring synchronism between the axes.

In the reset embodiment of the present invention, the generation means employs count-comparison techniques like those described in the above-identified application, Ser. No. 645,161. Briefly, the count-comparison technique involves comparing the count in an $n$-counter with the count in an N-counter as the N-counter is stepped cyclically from 0 to N−1. At the times when the cyclically advancing count in the N-counter (advancing at frequency NF) reaches a value of $n$ and then reaches a value of N−$n$, as occurs once each cycle of N counts at frequency F for each value $n$ and N−$n$, coincidence outputs are obtained.

Those coincidence outputs, developed in the reset embodiment when the N-counter reaches N−$n$, form a leading signal having a pulse in each cycle leading the reset time at which the N-counter is reset from N-1 to 0. Those coincidence outputs developed when the N-counter reaches $n$ form a lagging signal having a pulse in each cycle lagging the reset time of the N-counter. The leading signal and the lagging signal are used to reset, once in each cycle, a first counter and a second counter, respectively, so that the first counter is reset at a point in time leading the N-counter reset time and the second counter is reset at a point in time lagging that N-counter reset time. Each counter is reset, therefore, at a frequency of F. The first and second counters are each stepped by a stepping signal having a frequency of MF where M is any integer. The stepping signals may be derived from the N-counter. Each counter includes M counting stages so that each counter develops a counter output signal of frequency F.

Still with reference to the reset embodiment, the counter output signals are logically combined to form pulse-width modulated signals including a fundamental frequency component having an amplitude proportional to a sinusoidal function of the angle $\theta$ where $\theta$ equals 360 ($n/N$) degrees.

While the manner of establishing the count difference in the counters of the present invention may take many forms as illustrated by the inhibit, symmetrical and reset embodiments, the fundamental method of deriving pulse-width modulated output signal by logically combining the phase-shifted outputs of two counters stepped by synchronously derived stepping pulses is common to all forms of the present invention. While three embodiments have been described, any means of establishing the digital count difference is, of course, within the scope of the present invention.

In accordance with the summary of the invention, an object of the invention to convert, in an improved, more economical manner, a digital information signal to an analog information signal. More particularly, an object of the invention is to carry out improved conversions between digital and analog forms such as is suitable for use in servo measuring and controlling systems.

Other objects, features, and advantages of the present invention will become more apparent in the light of the following detailed description thereof, as illustrated in the drawings.

DETAILED DESCRIPTION

Figure 1:
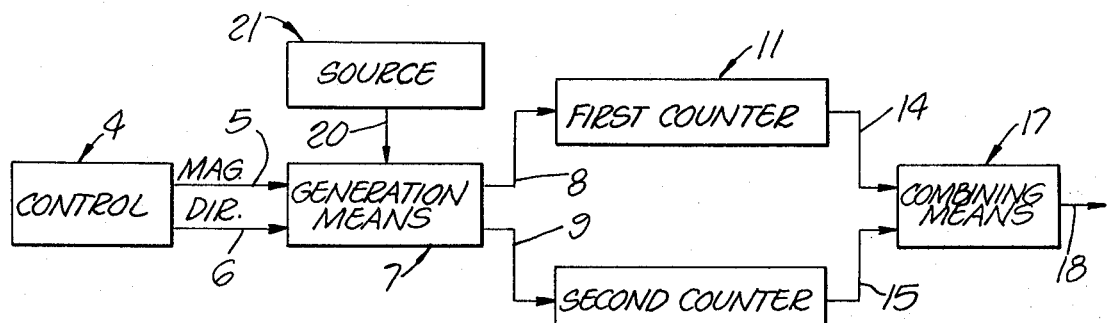
FIG. 1 depicts, in block diagram form, one basic converter embodiment of the present invention.

FIG. 1 depicts a digital-to-analog converter in accordance with the present invention in which the control 4 determines by digital outputs on lines 5 and 6 the magnitude of and the direction of, respectively, the change in count difference between the counts in the counters 11 and 12 as generated by generation means 7. The term "direction", for the purposes of this specification, is defined to mean whether the change in count difference tends to cause counter 11 to have a greater count than counter 12, or vice versa. When the converter of the present invention is used in a system with a data element, then "direction" also specifies the relative movement, in one or the other of two directions, of two relatively movable members of the data element.

The outputs on lines 14 and 15 from the counters 11 and 12, respectively, are combined in combining means 17 to form two or more outputs on two or more lines, represented in FIG. 1 by numeral 18, which each include a frequency component signal having an amplitude proportional to a function of the difference in count between the counts in counters 11 and 12. The generation means 7 is connected via line 20 to the source 21 where source 21 generates a substantially constant frequency train of pulses.

Figure 5:
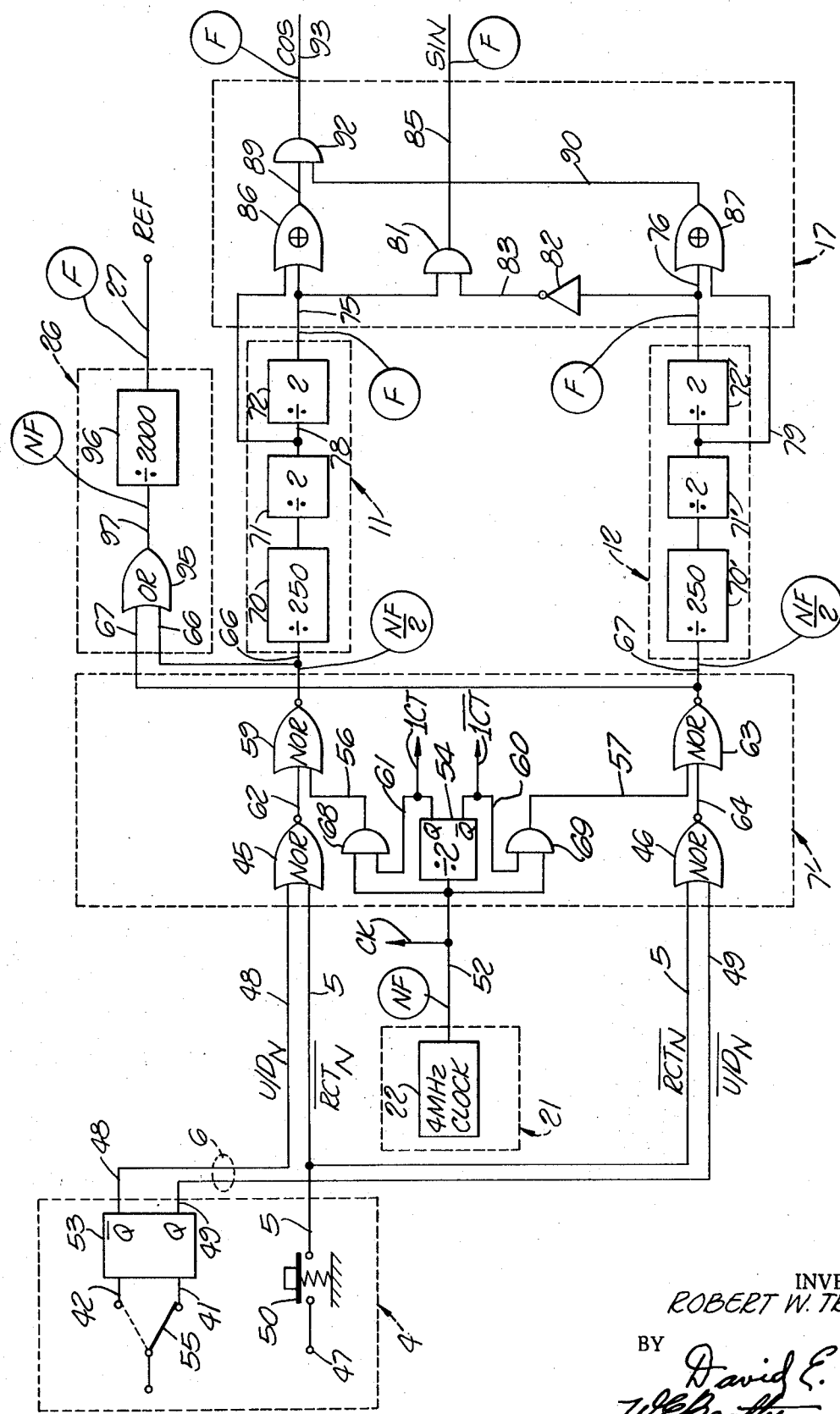
FIG. 5 depicts the details of a first preferred embodiment, (inhibit embodiment) of the FIG. 2 apparatus wherein the control 4 includes simple, manual switches.
Figure 7:
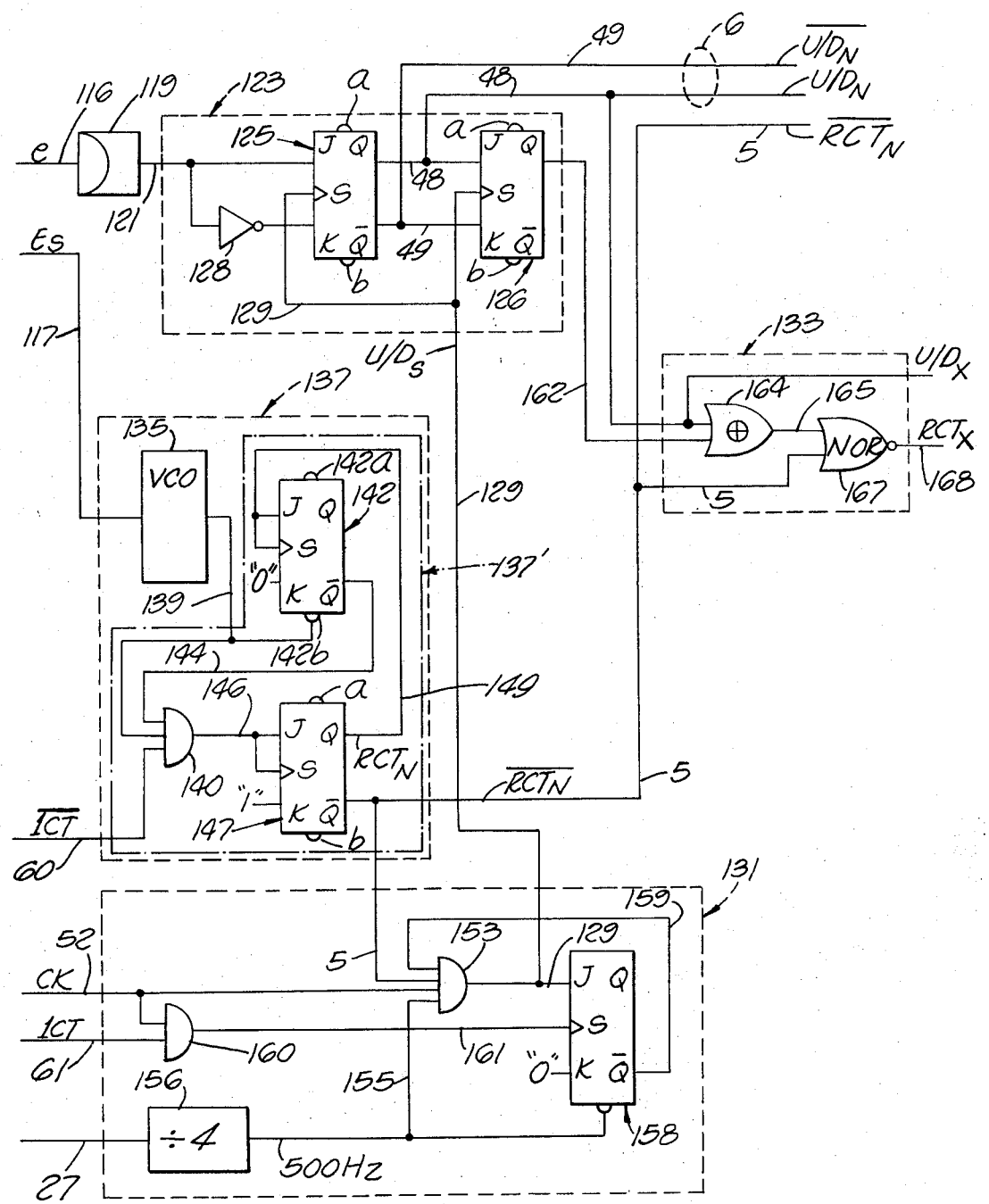
FIG. 7 depicts an automatic embodiment of the control 4 of FIG. 2 which is preferred for use with the FIG. 5 circuitry and which is substituted for the manual control 4 in FIG. 5.
Figure 10:
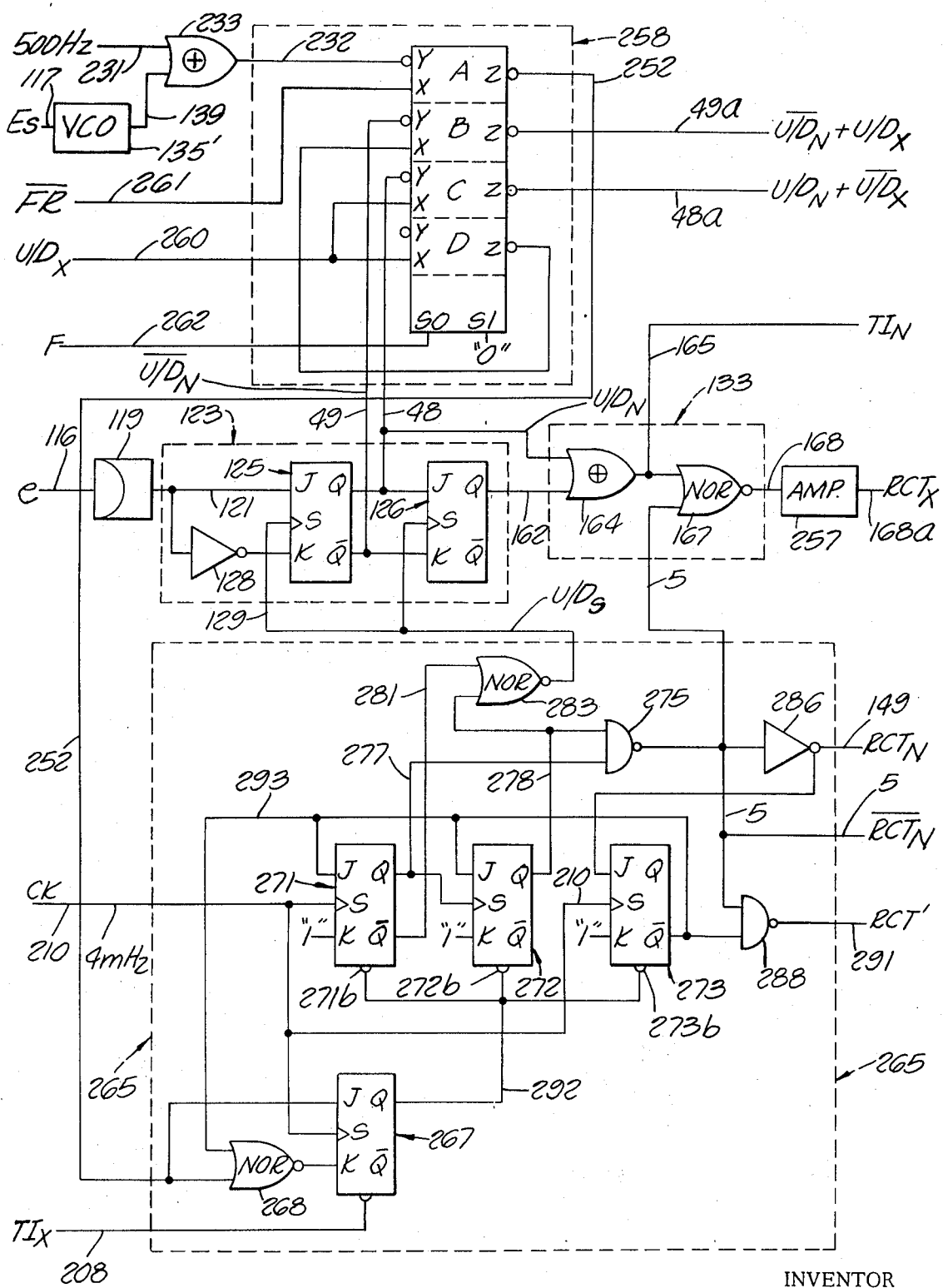
FIG. 10 depicts an automatic embodiment of the control 4 of FIG. 2 which is preferred for use with the FIG. 9 circuitry.

The control 4 may include simple manual switches, as shown in FIG. 5, or may include automatic circuitry useful in servo systems as shown in FIGS. 7 and 10. In any of the embodiments, control 4 functions to digitally control the magnitude and direction of the count difference generated by generation means 7 in the counters 11 and 12. The control 4 may also be a digital number output from a general purpose computer where the magnitude of the number is proportional to the desired count difference, and the sign of the number (plus or minus) is indicative of the direction. As shown in FIGS. 7 and 10, described hereinafter, the control 4 may be special circuitry including an analog-to-digital converter such as a variable frequency oscillator which generates, as an output on line 5, a serial train of digital pulses where the number of such pulses digitally determines the change in count difference between the counts in counters 11 and 12.

When the converters of the present invention are embodied in a system including a data element, the change in count difference is a digital input where each pulse in that train is typically representative of an increment of distance actually travelled or to be travelled by the relatively movable members of the data element. The frequency of the pulses in the pulse train is representative of the speed with which the relatively movable members of the data element travel.

Figure 9:
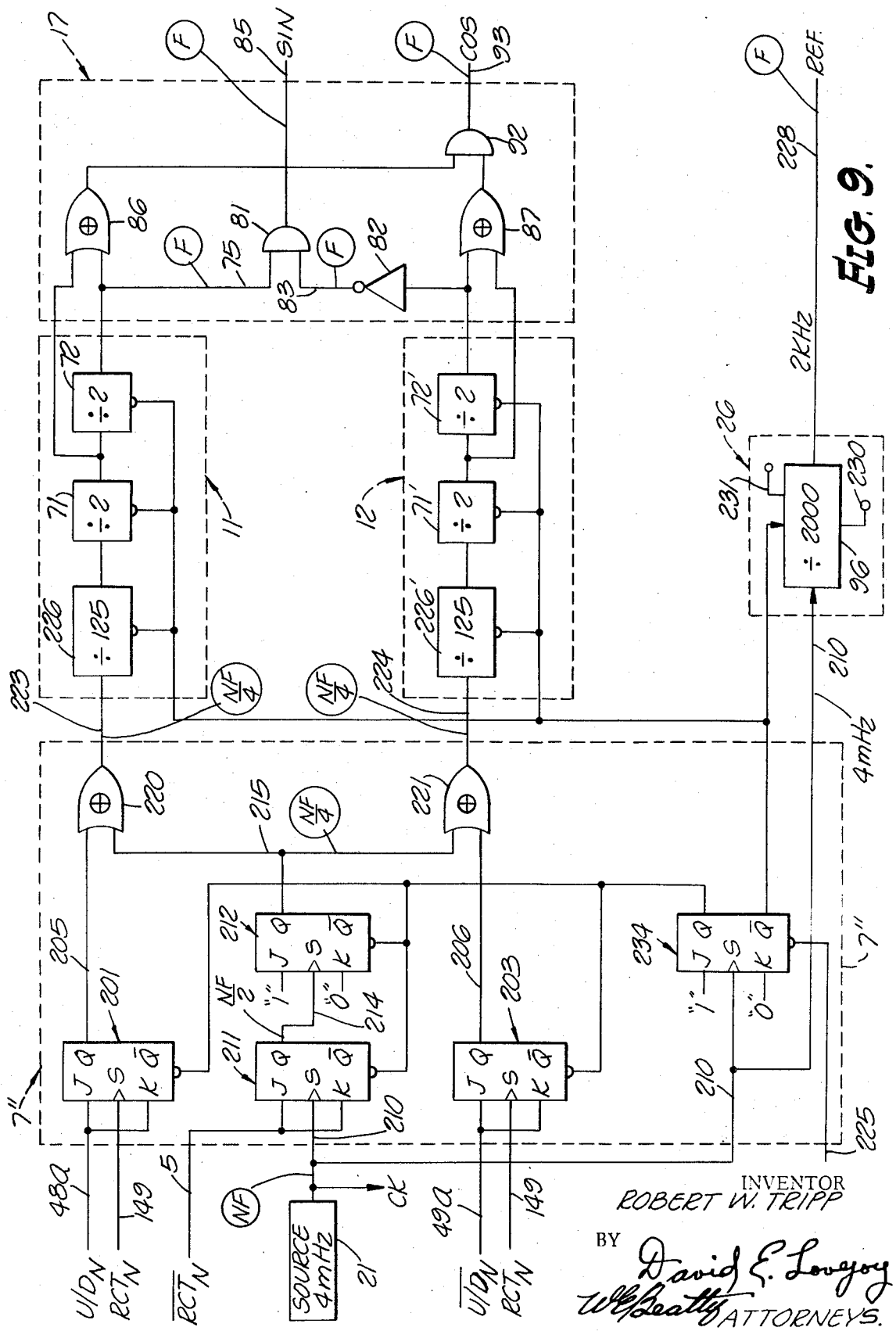
FIG. 9 depicts the details of a second preferred embodiment (symmetrical embodiment) of portions of the FIG. 2 circuitry.
Figure 13:
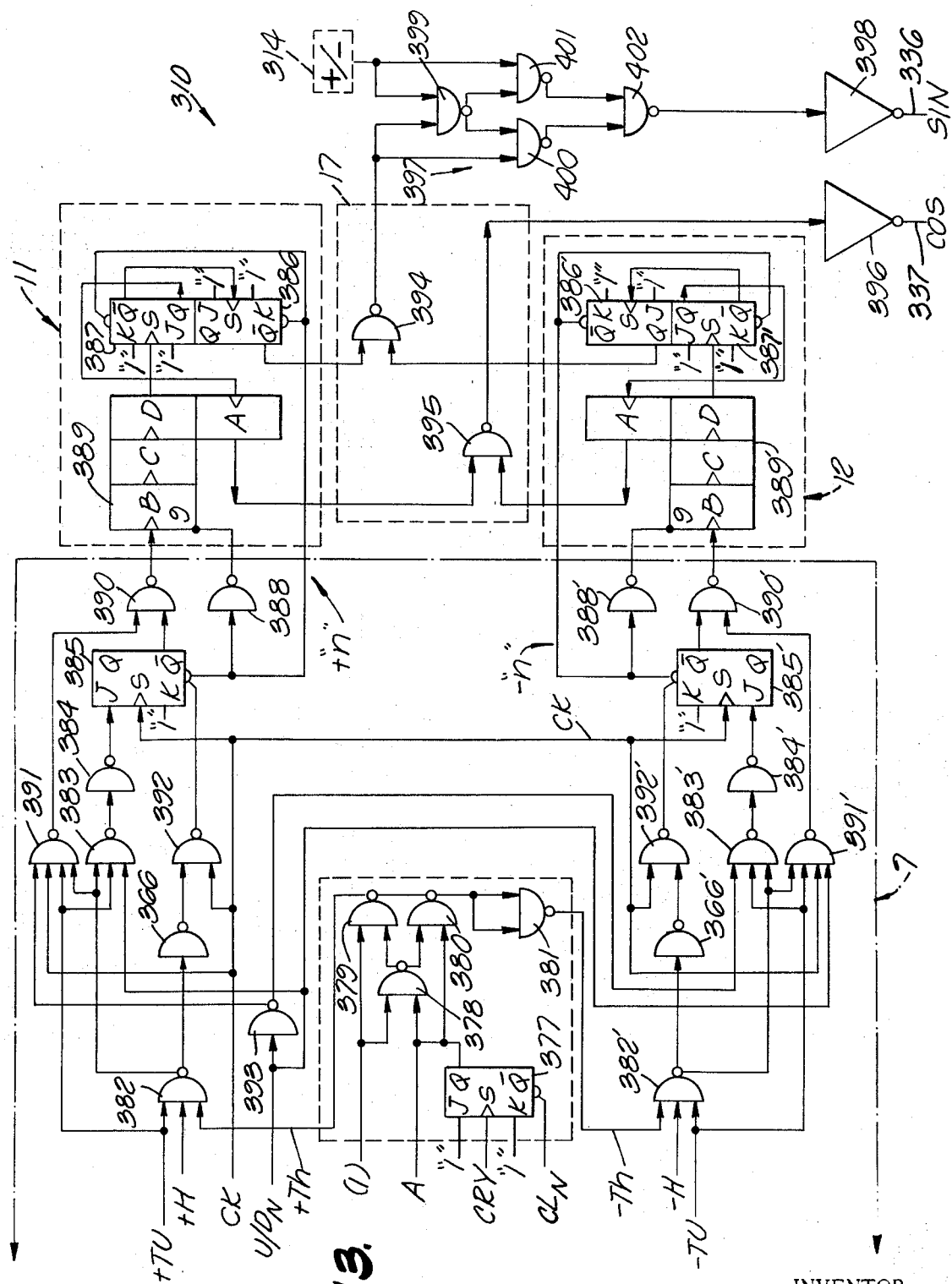
FIG. 13 depicts the details of a third preferred embodiment (reset embodiment) of portions of the FIG. 2 circuitry.
Figure 14:
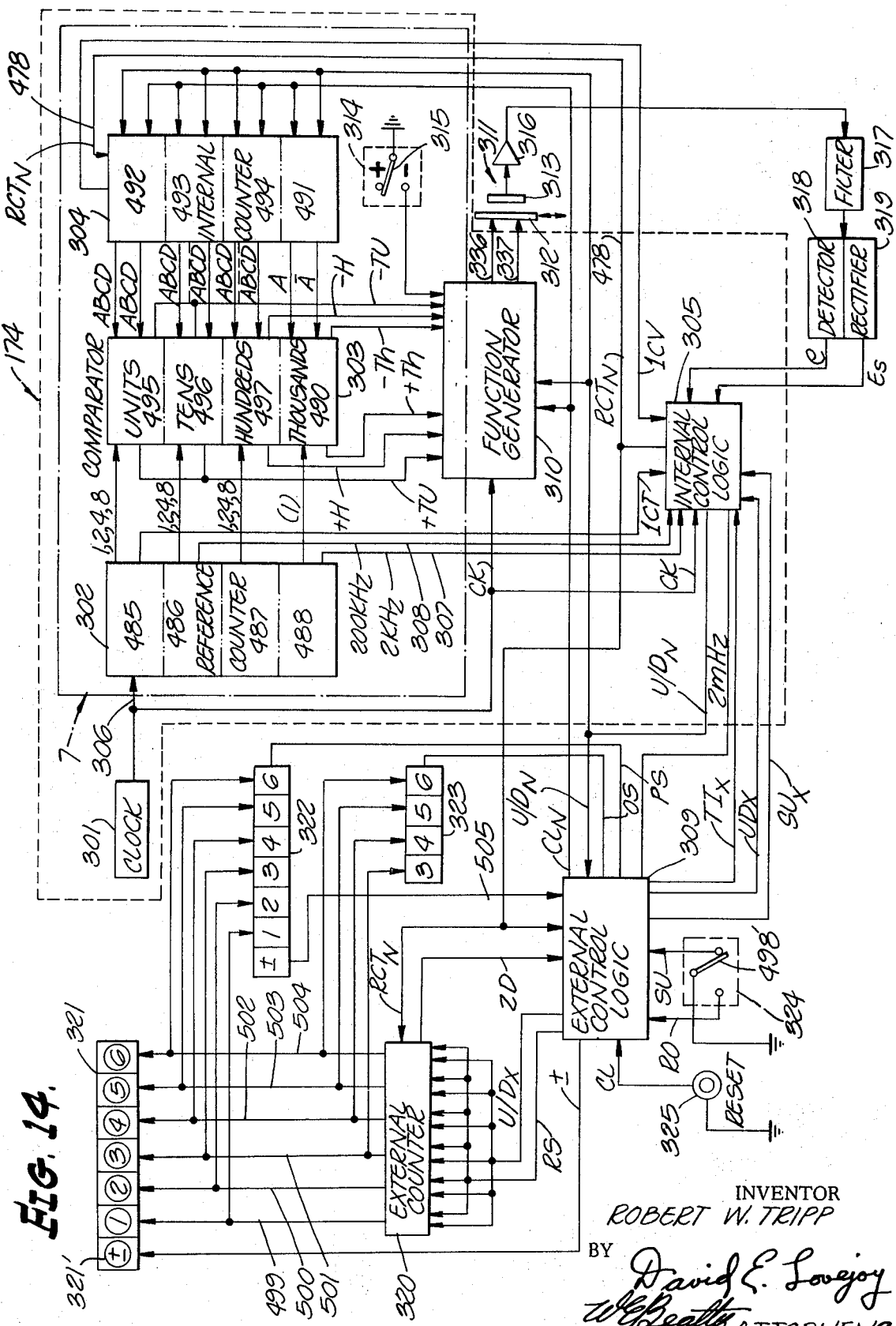
FIG. 14 depicts further details of the reset embodiment as connected within a digital readout servo system.

The generation means 7 is shown in one detailed embodiment in FIG. 5, described hereinafter, as an alteration means 7' where pulses from source 21 are inhibited from being applied either to the first counter 11 or to the second counter 12 depending upon the "1" or "0" (also described as "up" or "down" and "high" or "low") status of direction as indicated on line 6. A second embodiment of generation means 7 is shown in FIG. 9 as another alteration means, where one of the counters 11 or 12 appears to gain one more stepping pulse than normally provided, while the other counter appears to lose one stepping pulse with respect to the number of stepping pulses normally provided. The number of occurrences of the inhibit in the FIG. 5 circuit or the loss and gain in FIG. 9 is dependent upon the digital input signal on line 5. Which counter loses and which counter gains, both with respect to the other counter, is controlled by line 6. The FIGS. 5 and 9 embodiments of the generation means 7 are characterized as alteration means because the circuits function to alter the number of digital stepping pulses applied to one counter with respect to the number applied to the other. In FIGS. 13 and 14, a different form of generation means 7 is shown which establishes a count difference by resetting the counters at different times. Of course, many embodiments equivalent to the FIG. 5, FIG. 9, and FIGS. 13 and 14 embodiments are within the scope of the present invention.

The source 21 may include any conventional clock or other means of generating one or more substantially constant frequency rectangular wave signals. With reference to FIG. 1, the counters 11 and 12, connected via lines 8 and 9, respectively, to the generation means 7 may be any conventional counters, such as binary counters, decade counters, or others well known in the art. Counters 11 and 12 also may be conventional registers found in general purpose computers. In this latter computer embodiment, the control 4 and generation means 7 may be implemented as part of a computer program or may be embodied in microprogram routines such as are generally stored in a read-only store.

The combining means 17 in one embodiment is shown in FIG. 5, described hereinafter, as a simple combination of AND and EXCLUSIVE-OR gates where the outputs formed are representative of sine and cosine signals. In that FIG. 5 embodiment, the two outputs are of the type used in a two-phase system. Other embodiments may be readily employed. For example, rather than the sine and cosine signals displaced by 90°, three signals displaced by 120° may be formed by the combining means 17. Such a three-phase system is described hereinafter in connection with FIG. 16. Still further, a K-phase system is shown in FIG. 17.

Figure 2:
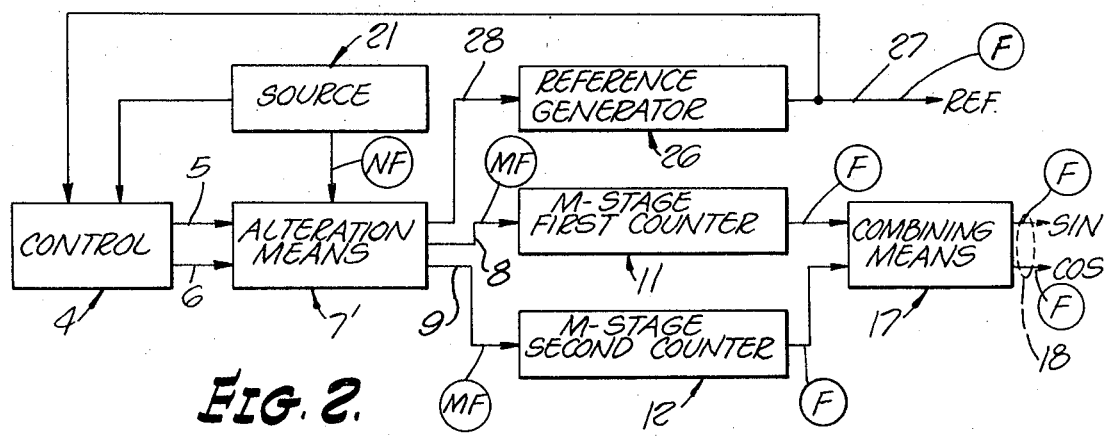
FIG. 2 depicts the embodiment of FIG. 1 including the addition of a reference generator, including an alteration means embodiment of the FIG. 1 generation means and including a two-phase combining means for generating sine and cosine signals.

In FIG. 2, the FIG. 1 apparatus is modified by adding a reference generator 26 which has an output from the alteration means 7' via line 28. Alteration means 7' in FIG. 2 is one embodiment of the generation means 7 of FIG. 1. The reference generator 26 maintains a count midway between the counts in counters 11 and 12 and is useful, among other things, in determining the sign of the output signals on lines 18, as discussed in more detail in connection with FIGS. 5 and 9.

Figure 3:
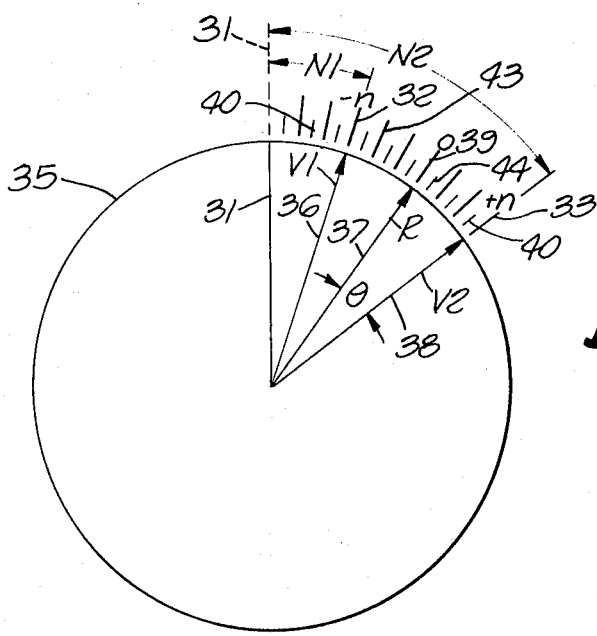
FIG. 3 depicts a vector representation of the operation of the FIG. 1 and FIG. 2 embodiments of the invention as represented at a given instant time.

FIG. 3 depicts a vector diagram useful in explaining the operation of the FIG. 1, FIG. 2, and other converter circuits of the present invention. In FIG. 3, vector V1, designated by numeral 36, represents the count in the first counter 11, and vector V2, designated by the numeral 38, represents the count in the second counter 12. At some arbitrary time, selected as a reference time and represented by line 31, both counters 11 and 12 are reset to zero. At some time later, counter 11 as represented by vector V1 has been stepped, by stepping pulses, three counts, to the position shown as indicated by the long line 32. Similarly, counter 12 as represented by vector V2 has been stepped nine counts to the position shown as indicated by the long line 33. In order for the counters 11 and 12 to be stepped in that manner, the source 21 causes nine stepping pulses to be generated and those nine pulses are normally applied both to the first counter 11 and to second counter 12. Due to the operation of the generation means 7 in combination with the control 4, however, a count difference between the counts in counter 11 and counter 12 is generated. In one embodiment, counter 11 has its stepping pulses inhibited for six pulses and accordingly is only incremented for three of the nine pulses as shown. If the counters 11 and 12 include 1,000 stages, then, of course, there would be 1,000 long lines around the periphery of the vector circle 35 like those designated by reference numerals 32 and 33.

Since the reference generator 26 is stepped once for each step of the first counter 11 and once for each step of the second counter 12, the reference generator 26 receives twelve stepping pulses, which number twelve is equal to the sum of the stepping pulses applied to counter 11 (three) and the pulses applied to counter 12 (nine). Since it is desired that the reference generator 26 have a count equal to one-half that sum, that is, half-way between the counts in counters 11 and 12, generator 26 includes in one embodiment one additional binary stage so that it divides by two the number of stepping pulses applied thereto. For example, as hereinafter described in connection with FIG. 5, reference generator 26 may include a 2,000 stage counter while counters 11 and 12 each include 1,000 stages, whereby the desired average, that is one-half the sum of the counts of counters 11 and 12, is obtained.

In FIG. 3, the count in reference generator 26 is represented by the reference vector R which is designated by numeral 37. In the chosen example, where nine-plus-three stepping pulses are applied to reference generator 26 on line 28, the reference vector R is stepped one-half that value to the sixth long line indicated by numeral 39. For each of the long lines like those indicated by numerals 32, 33, and 39, there are additionally, an equal number of short lines 40 interspersed between each of the long lines. The reference vector R is stepped to each of the short lines 40 and also to each of the long lines, while the vectors V1 and V2 are only stepped to the long lines.

Referring to FIG. 3, the number of counts which the vector V1 has travelled from the reference time indicated by line 31 is indicated by N1, which is equal to the count in the first counter 11. Similarly, the distance which the vector V2 has travelled from the same line 31 is designated by N2, which is equal to the count in the second counter 12. The reference vector R is always positioned half-way between N1 and N2, and since it is the reference, it is arbitrarily designated as the O point. From this O point, the vectors V1 and V2 are displaced by a count of $-n$ and $+n$, respectively, as indicated in FIG. 3.

In FIG. 3, the total number, N, of short and long lines around the circle is equal to the count range of reference generator 26 in FIG. 2 which counts in increments of $1/N$. Counters 11 and 12, in one embodiment such as FIG. 5, count in increments of $2/N$. Therefore, in the above example where V1 was stepped three times and V2 nine times, the magnitude of both $+n$ and $-n$ is six $1/N$ increments.

By definition, the angle between the vectors R and V1 and the equal angle between vectors R and V2 is defined as $\theta$. In accordance with the above notation, "$\theta = 360 (n/N)$ degrees" is an expression for the value of $\theta$ in terms of $n$ and N.

Figure 4A:
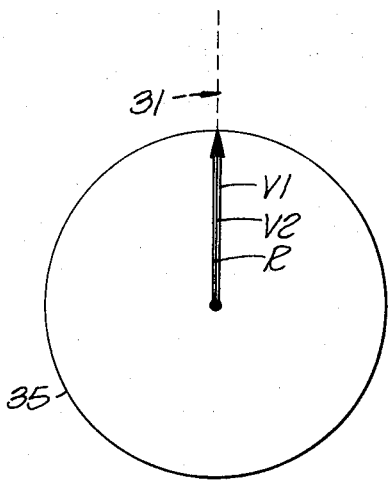
FIG. 4($a$) through 4 ($e$) depict vector diagrams representative of the operation of the FIG. 1 and FIG. 2 embodiments showing from ($a$) through ($e$) a plurality of typical, sequential instants of time.
Figure 4D:
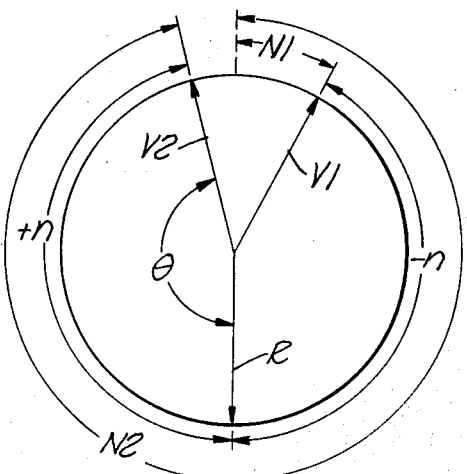
Figure 4B:
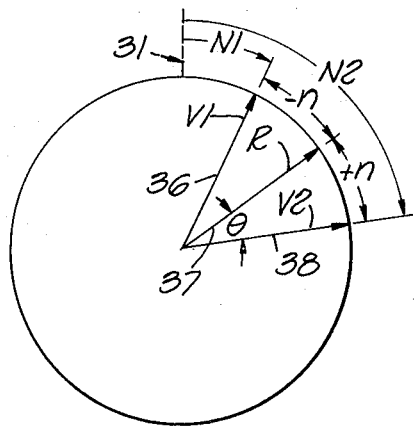
Figure 4E:
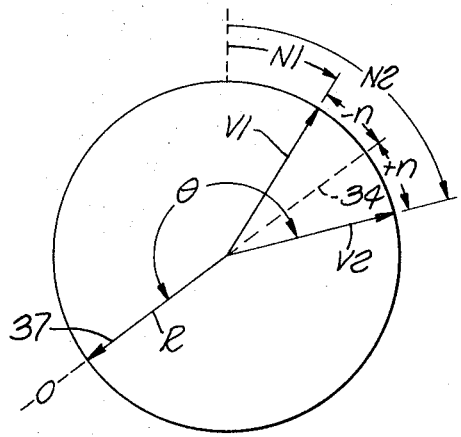
Figure 4C:
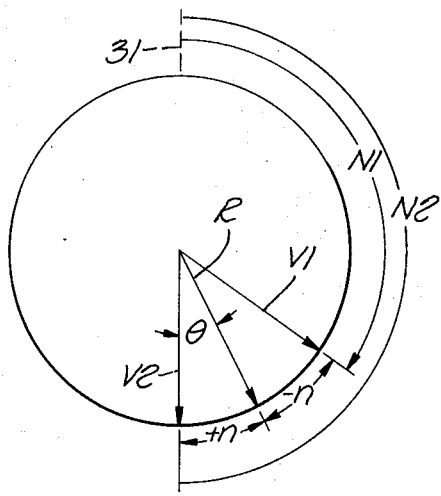

FIGS. 4(a) through 4(e) are vector diagrams of the FIG. 3 type but which are simplified for clarity. FIG. 4(a) depicts a simplified vector diagram which represents some arbitrary time indicated by line 31 at which the counters 11 and 12, and therefore generator 26, have been reset to a zero condition. FIG. 4(b) demonstrates that at some later time, counters 11 and 12, and therefore vectors V1 and V2, have a count difference generated in a manner similar to that previously described in connection with FIG. 3. In FIG. 4(c), the counts N1 and N2 have increased but the values of $+n$ and $-n$ have remained the same as in FIG. 4(b).

Note also in comparing FIG. 4(c) with FIG. 4(b) that the reference vector R is at a different position. In actuality, the vectors V1, V2, and R in FIG. 4(b) may have passed through the reference position indicated by line 31 in their clockwise rotation from the starting point before assuming their indicated positions in FIG. 4(b). Similarly, the vectors shown in FIG. 4(c) may have passed through the reference position indicated by line 31 several or many times before they arrived at their present position in FIG. 4(c).

FIG. 4(d) represents a vector diagram in which the angle $\theta$ exceeds 90°. In FIG. 4(d), it should be noted that as in FIGS. 4(b) and 4(c), the clockwise order of the vectors is V1, R, and V2. By way of contrast, in FIG. 4(e), counter 11 has been altered with respect to counter 12 to the point where vector V2 has gained one complete revolution on vector V1 so that the now clockwise order of the vectors is V1, V2, and R, just the reverse of the previous order of FIG. 4(d). This reversal in order signifies that θ has exceeded 180° and that sin θ has gone from positive to negative. Note in FIG. 4(e) that +n and −n are measured from the extension of reference vector R designated by dotted line 34 rather than from reference vector R.

INHIBIT EMBODIMENT

FIG. 5 depicts the converter of FIG. 2 in more detail in accordance with an inhibit embodiment of the present invention. The alteration means 7' includes NOR gates 45 and 46 which receive inputs from control 4 including a $U/D_N$ signal on line 48 and a $\overline{U/D_N}$ signal on line 49, respectively, and a $\overline{RCT_N}$ signal on line 5.

The signals on lines 5, 48 and 49 are conveniently generated in a manual embodiment of control 4 by switch 50, the Q output of conventional latch 53 and the $\overline{Q}$ output of latch 53, respectively. Latch 53 exhibits complementary outputs, that is, when line 48 is 1, line 49 is 0 and vice versa. The status of latch 53 is controlled by the position 41 or 42 of switch 55 causing line 48 to be "1" and "0", respectively, and causing line 49 to be "0" and "1", respectively. Switch 50 is connected a suitable voltage level 47 so that when switch 50 is momentarily closed, a "0" input is provided to NOR gate 45 and NOR gate 46 via line 5. When switch 55 is in position 41 as shown, NOR gate 46 receives a "0" via line 49. Similarly, NOR gate 45 receives a "0" via line 48 when switch 55 is in position 42. Alternate means of generating the inputs on lines 48, 49, and 5 will be discussed hereinafter in connection with the description of the FIG. 7 and FIG. 10 embodiments of control 4.

In addition to the inputs from the control 4, the alteration means 7' includes an input on line 52 to counter 54 from the source 21. Source 21 includes a conventional 4MHz clock 22 of any well known design.

IN FIG. 5, the output from the source 21 is connected via line 52 to a conventional counter 54 in alteration means 7'. Counter 54 serves to divide the 4MHz signal on line 52 by two forming two synchronously derived 2MHz signals on lines 60 and 61 which are also designated by 1CT and $\overline{1CT}$, respectively. The signals on lines 60 and 61 are derived from the complementary outputs Q and $\overline{Q}$ of counter 54, respectively. The line 61 is connected as one input to the AND gate 68. The other input to AND gate 68 is derived from the 4MHz source signal on line 52. AND gate 68 develops the logical AND function of the 2MHz signal on line 61 with the 4MHz signal on line 52 to form a 2MHz stepping pulse signal on line 56. The 2MHz signal on line 56 is connected as one input to the NOR gate 59 and provides stepping pulses, synchronously derived from source 21, through nor gate 59 to counter 11 unless gate 59 is inhibited by a "1" on line 62. The other input, on line 62, to gate 59 operates to selectively inhibit, as a function of the "1" or "0" output from NOR gate 45 on line 62, the stepping pulses on line 56 from being applied via line 66 to counter 11. The inhibit signal in the form of a "1" on line 62 is present except when lines 48 and 5 input to NOR gate 45 are "0's", in which case line 62 is "0".

Similarly, the other 2MHz signal from counter 54 appearing on line 60 is connected as one input to AND gate 69. AND gate 69 receives the 4MHz source signal on line 52 as its other input and forms a 2MHz signal output on line 57 which is connected as an input to NOR 63. Line 57 contains 2MHz stepping pulses synchronously derived from source 21. The stepping pulses on line 57 are transmitted through NOR gate 63 via line 67 to the counter 12 when not inhibited by "1" on line 64. Line 64 is an input to gate 63 and has a "1" when the inputs on lines 5 and 49 to NOR gate 46 are "0's" and, at other times, line 64 is "0". It should be noted that the operation of NOR gate 46 is complementary to the operation of NOR gate 45, that is, when one is energized with a "1" output the other has a "0" output and vice versa.

Counter 11 and counter 12 are two identical counters well known in the art. Since a count or division by 1,000 desired, the counters 11 and 12 are each composed of three conventional stages 70, 71, and 72, and 70', 71' and 72', respectively, which divide by, that is exhibit counts of, 250, 2 and 2, respectively. The counters 11 and 12 develop output square wave signals on lines 75 and 76, respectively, from the last stages 72 and 72' of the counters 11 and 12. The output pulses on lines 75 and 76 occur at 1/1000th the frequency of the 2MHz stepping pulses on lines 66 and 67. An additional output for counter 11 is derived on line 78 from the output of the next-to-last stage 71. Similarly, an output on line 79 is derived in counter 12 from its next-to-last stage 71'. The two outputs on lines 75 and 76 include signals of the same frequency which are phase-shifted with respect to each other an amount depending upon the number of stepping pulses inhibited from being applied to one of the counters 11 or 12 with respect to the number of stepping pulses inhibited from being applied to the other of the counters 11 and 12. The outputs on lines 78 and 79 are similar to the outputs on lines 75 and 76 but have signals at twice the frequency.

The four outputs on lines 75, 76, 78 and 79, serve as inputs to the combining means 17 which functions to convert those outputs to pulse-width modulated analog signals proportional to sin θ and cos θ on line 85 and 93, respectively. Combining means 17 includes AND GATE 81 for logically combining the counter output on line 75 with the inverted counter output on line 76, as inverted in conventional inverter 82 and appearing on output line 83. The logical combination of the signals on lines 75 and 83 in AND gate 81 forms a rectangular wave output signal on line 85 which output signal has an analog component, namely pulse width, proportional to the digital count difference between the counts in the counters 11 and 12.

EXCLUSIVE-OR gates 86 and 87 having inputs from lines 78 and 75, and from lines 76 and 79, respectively, function to phase shift the outputs from the last stages 72 and 72' of counters 11 and 12 by 90 electrical degrees forming phase-shifted signals, of the same frequency as the signals on lines 75 and 76, on lines 89 and 90, respectively. The phase-shifted signals on lines 89 and 90 are then logically combined in AND gate 92, to form a rectangular wave output signal on line 93 which output signal has an analog component, namely pulse width, proportional to the digital count difference between the counts in the counters 11 and 12.

The reference generator 26 includes a conventional reference counter 96 of count 2,000 which receives through OR gate 95 via line 97 each stepping pulse applied to counter 11 on line 66 and each stepping pulse applied to counter 12 on line 67. Since counter 96 does receive stepping pulses from both lines 66 and 67 via line 97, counter 96 receives essentially twice as many stepping pulses as either counter 11 or counter 12, that is, the frequency, substantially NF, of the signal on line 97 is twice that of the signal on line 66 or of the signal on line 67. The generator 26 has an output reference signal on line 27 from the counter 96 of the same frequency F as the output signals on lines 75 and 76 from counters 11 and 12, respectively. The frequency is the same because, although the input frequency on line 97 is twice as high, counter 96 is compensatingly twice as long as counters 11 and 12.

The reference signal on line 27 is useful in determining the sign of the output signals from the combining means 17, which signals are typically proportional to sine $\theta$ and cosine $\theta$. When the converters of the present invention are embodied within a system including a data element which develops an error signal, the reference signal on line 27 is typically also employed as an input to a phase detector operating to phase detect that error signal as will be described further hereinafter.

OPERATION OF INHIBIT EMBODIMENT

The operation of the inhibit embodiment of FIG. 5 is readily understood with reference to the waveforms of FIG. 6. In FIG. 6(a), waveform aa depicts in waveforms 101 and 102 a symbolic representation of the number, between 0 and N/2-1, of stepping pulses applied to counters 11 and 12, respectively. Similarly, waveform 103 is a symbolic representation of the number of stepping pulses between 0 and (N-1), applied to counter 96. Note that waveforms 101 and 102 in FIG. 6(a) are superimposed meaning that no pulses have been inhibited from either counter 11 or 12 and that those counters were initially reset to the same count by conventional reset means (not shown) and continue to count in synchronism and reset at times t0, t2, t4. Although waveforms 101, 102 and 103 are shown composed of straight lines, the straight lines are merely an approximation of a staircase waveform where each step in the staircase would represent one more stepping pulse applied on lines 66, 67, and 97, respectively. Additionally, waveforms 101, 102 and 103 are not representative of the electrical stepping pulse inputs to the counters but are merely representative of the number of stepping pulse inputs. Each stepping pulse input is typically only a negative-going pulse.

In FIGS. 6 and the other figures depicting waveforms, the waveforms are designated by numbers identical to numbers representing lines or other locations in other figures except that those numbers associated with the waveforms have a prime added thereto. For example, line 75 of FIG. 5 carries a signal represented by waveform 75' in FIGS. 6 (also designated as waveform ab in FIG. 6(a)).

Waveform ab in FIG. 6(a( depicts the output of counter 11 (of count N/2 equal to 1,000) on line 75, and it is apparent from inspection of that waveform that line 75 is in the zero state until counter 11 has received 500 stepping pulses on line 66. On the 500th pulse and each succeeding 500th pulse (where 500 equals the combined count of stages 70 and 71) line 78 has a transition which switches the last stage 72 of counter 11 causing a transition on output line 75. The transition on line 75 from a "0" to a "1" after the 500th pulse, is indicated at t1. The line 75 is again switched back to "0" after 500 more stepping pulses are received on line 66 of counter 11, as shown at t2. This periodic switching from "1" to "0" and "0" to "1" continues as shown at times t3, t4, etc.

In a similar manner, output line 76 from the last stage 72' of counter 12 is switched from "1" to "0" at time t1 and a waveform of the signal on line 76 is identical to the waveform on line 75 and therefore also is represented by waveform ab.

Because of the inverter 82 in FIG. 5, the output signal on line 83, shown as waveform ac, is substantially the inversion of the waveform ab since the counters 11 and 12 are counting in timed relation because they are incremented by stepping pulses synchronously derived from clock 22. Although counters 11 and 12 are actually stepped during alternate pulses from clock 22 this one clock pulse shift from synchronism is a constant and is negligible at the counter outputs and is, therefore, ignored in this specification.

Figure 6A:
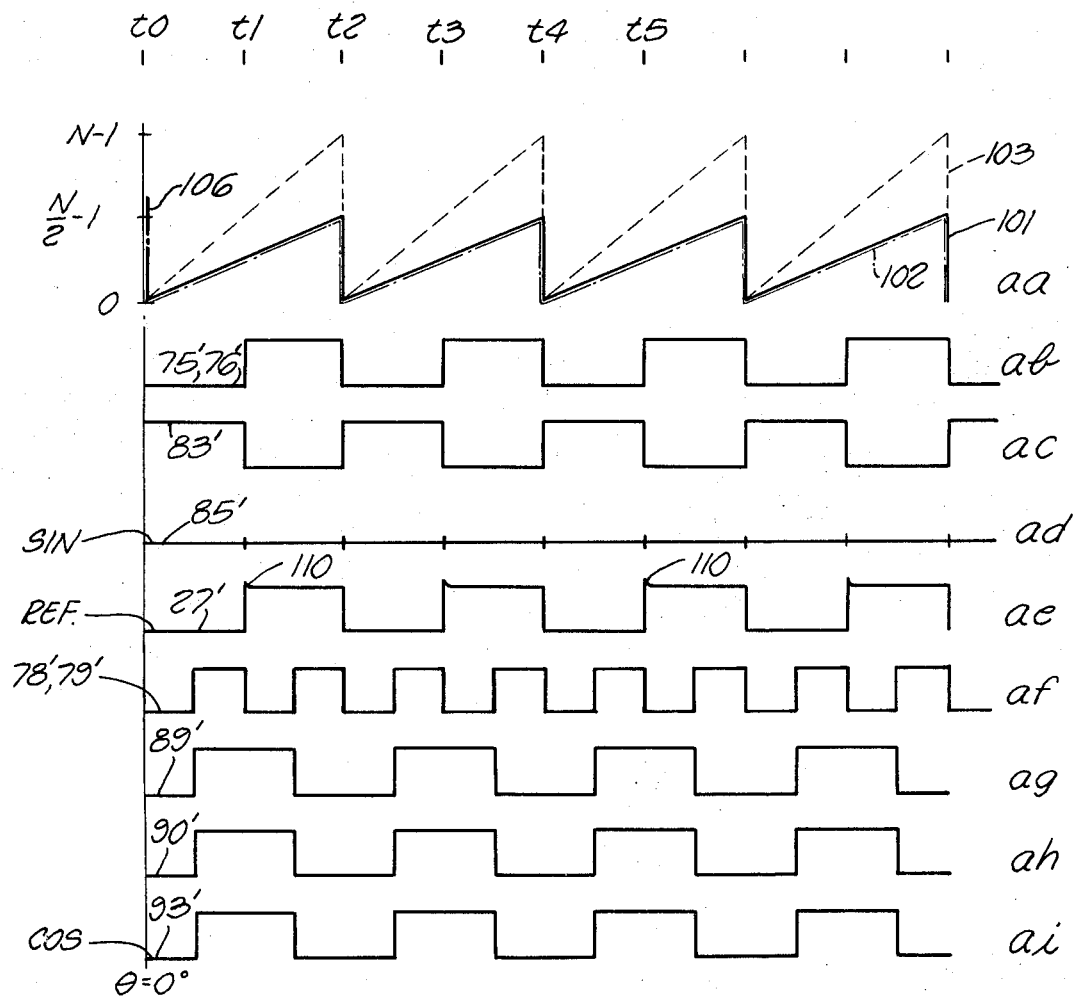
FIGS. 6($a$) through 6 ($g$)each depict a plurality of waveforms, each illustrative of several cycles through which the first and second counters count from 0 to N−1 and together depicting a comparison of various signals at different values of count difference between the counts in the first and second counters.

AND gate 81 in FIG. 5 has as inputs the waveforms ab and ac and forms on line 85 the waveform ad which, in FIG. 6(a), is a steady state dc signal having a zero amplitude ac component which is indicative of the fact that counters 11 and 12 are counting substantially in synchronism and that they exhibit no count difference.

The output waveform ad is further indicative, with reference to FIG. 4(a), of the fact that the angle $\theta$ between reference vector R and vector V2 is zero so that the sine of the angle $\theta$ is also zero.

Still with reference to FIG. 6(a), waveform ae depicts the output on line 27 from counter 96. Note that the output on line 27 as represented by waveform ae is also in-phase with the waveform ab.

Waveforms ag and ah, used for developing the cosine signal, represent the output signals from the EXCLUSIVE-OR gates appearing on line 89 (as derived from the signals on lines 78 and 75) and on line 90 (as derived from the signals on lines 78 and 76), respectively. Note that the frequency of the signals on lines 89 and 90 is one-half the frequency of the signals on lines 78 and 79. These EXCLUSIVE-OR gate outputs on lines 89 and 90 effectively phase-shift by 90 degrees the outputs on lines 75 and 76. Note that the waveform on line 83 used for developing the sine signal, is phase-shifted 180°, by inverter 82, from the waveform on line 76 so that the waveform on line 90 used for developing the cosine signal, is phase-shifted 90+180, degrees from the waveform on line 83. Since 270° is equivalent to −90° the waveform on line 90 is −90° from the waveform on line 83. These phase-shifted outputs represented by waveforms ag and ah are logically combined in AND gate 92 to form the cosine waveform on output line 93 as shown by waveform ai in FIG. 6(a). Note that the waveform ai has a 50 percent duty cycle which is a condition for generating a maximum magnitude ac fundamental frequency component. This maximum magnitude with reference to FIG. 4(a), is indicative of the angle $\theta$ equal 0 and more particularly, cosine $\theta$ equal 1.

Figure 6B:
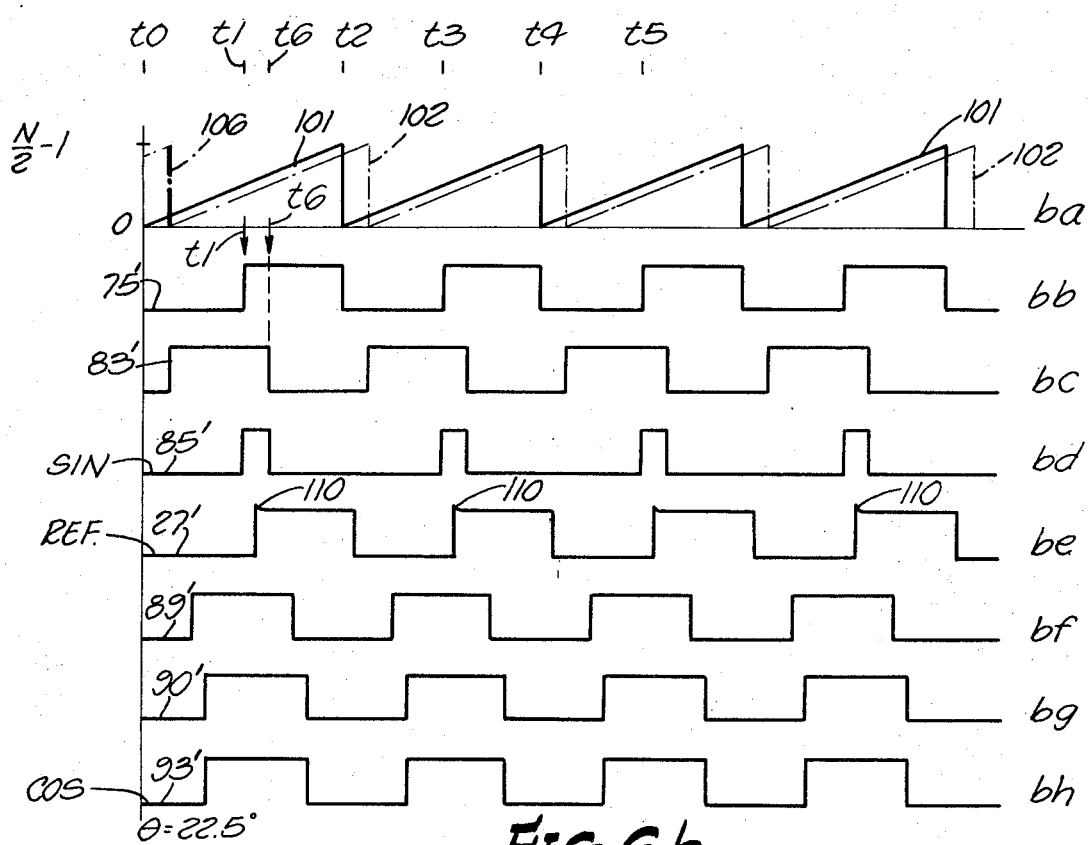

In FIG. 6(b), counter 12 has had approximately 125 stepping pulses inhibited ($\theta = 22.5°$) with respect to counter 11 as indicated in waveform ba by the fact that waveform 102 reaches the maximum magnitude N/2-1 approximately ⅛th of a cycle after waveform 101. Since the counter 11 has not had any of its stepping pulses inhibited, the waveform bb appears the same as the waveform ab of FIG. 6(a). Since the counter 12 has had stepping pulses inhibited, the output of counter 12 on line 83 as represented by waveform bc reaches the mid-point count (499) sometime, t6, after the output of counter 11, on line 75 as represented by waveform bb, reaches the mid-point count at time t1 as is apparent from waveform bc. The logical combination of the bb and bc waveforms results in the bd waveform of the signal on line 85 which exhibits periodic positive pulses having pulse widths of t1– t6, representative of sin $\theta$.

Still referring to FIG. 6(b), the reference waveform be of the signal on line 27 is seen to lag the waveform bb by half the amount that the trailing edge of waveform bc (as shown at t6) lags the waveform bb. With reference to FIG. 5, it is clear, as previously explained in connection with FIG. 3, that the reference counter 96 as represented by the reference vector R has a count midway between the count represented by vector V1 and depicted by waveform 101 and the count represented by vector V1 and depicted by waveform 102.

As a matter of arbitrary convenience, the positive-going transition of the reference waveform has been chosen as a reference point and has been given a marker 110 for ease in comparing waveforms. The marker 110 is symmetrically located, that is has a constant phase, with respect to both the line 85 sine pulses and the line 93 cosine pulses.

In a manner similar to FIG. 6(a), and still with reference to FIG. 6(b), waveforms bf (line 89) and bg (line 90) represent the 90° phase shift of the waveforms bb (line 75) and bc (line 83), respectively. Specifically, waveform bf lags waveform bb and waveform bg leads waveform bc. Similarly, the waveform bh represents the logical AND function on line 93 of those phase-shifted waveforms 89' and 90'. Note that while the sine of the angle, as represented by the waveform bd, has a pulse width that has increased from a zero value, as shown by waveform ad in FIG. 6(a), to a small value, as shown by waveform bd of FIG. 6(b), the cosine value has decreased from a maximum value, in FIG. 6(a), to a somewhat smaller but still large value in FIG. 6(b) as is appropriate when an angle $\theta$ increased from a zero value to a small value.

Figure 6C:
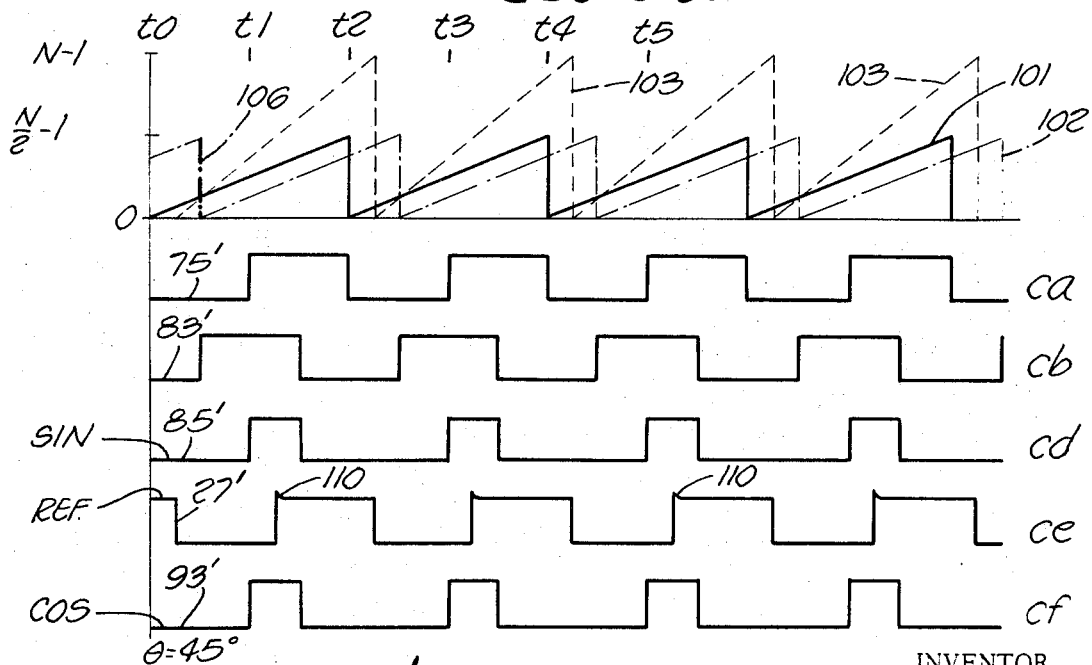
Figure 6D:
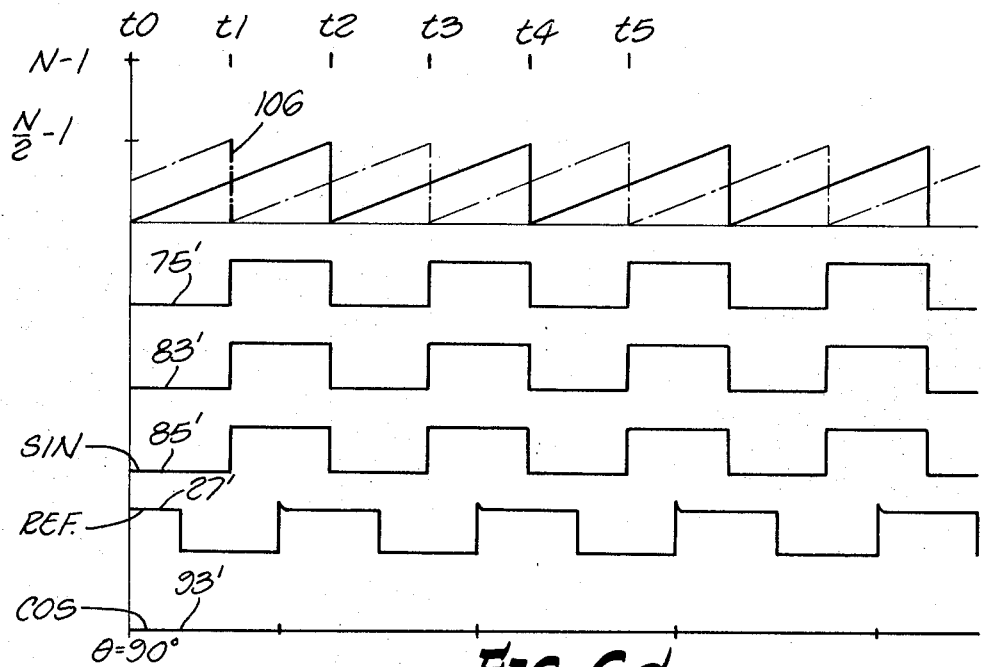
Figure 6E:
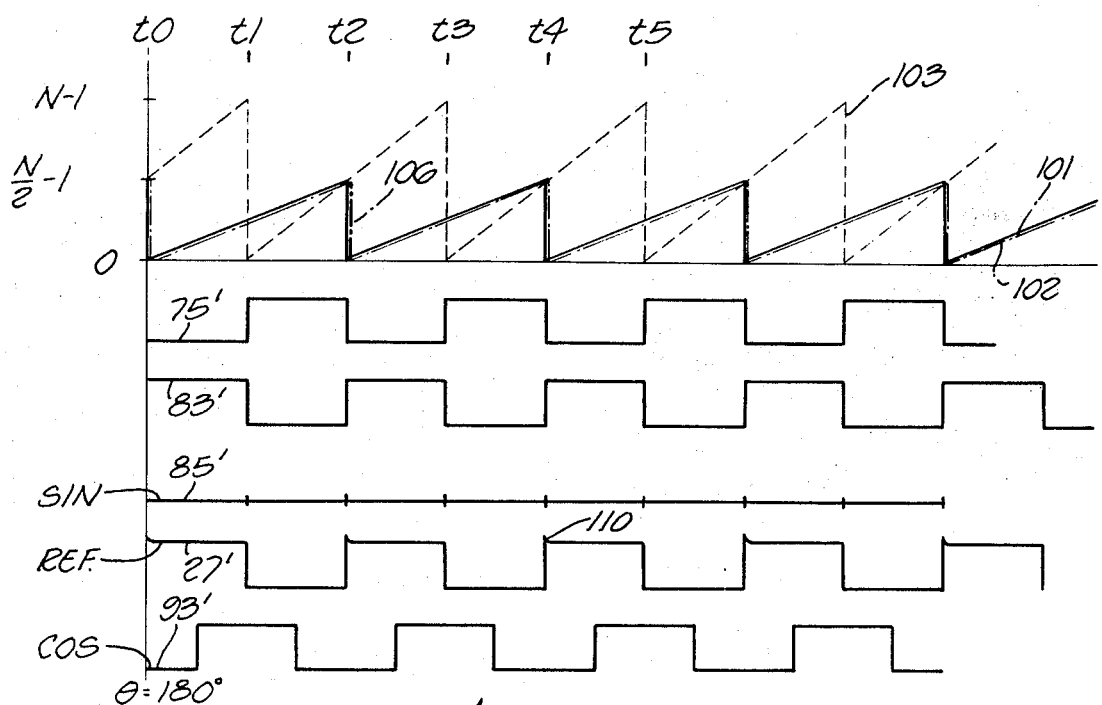

In FIG. 6(c), counter 12 has had stepping pulses inhibited by the alteration means 7' so as to establish a count difference of approximately 250 between the counts in counters 11 and 12. With that difference in count, $\theta$ as defined in connection with FIG. 3, equals 45°. Since the counter 11 has not had stepping pulses inhibited, the waveform ca from the output on line 75 is identical to the waveform aa as shown in FIG. 6(a). The waveform cb (line 83), generated by inverter 82 from the output of counter 12, is shifted as compared with the output bc (line 83) in FIG. 6(b). In accordance with the alteration of the count difference between the counters 11 and 12, the output on line 85 in FIG. 6(c), representative of sin $\theta$, is shown as waveform cd where the pulse widths are greater than for sin $\theta$ in FIG. 6(b). Similar changes in the reference output ce on line 27 and in the cos $\theta$ output on line 93 are apparent from inspection of FIG. 6(c).

FIGS. 6(d), 6(e), 6(f), and 6(g), depict waveforms descriptive of the FIG. 5 circuitry for values of $\theta$ at 90°, 180°, 270°, and 315°, respectively.

Figure 6F:
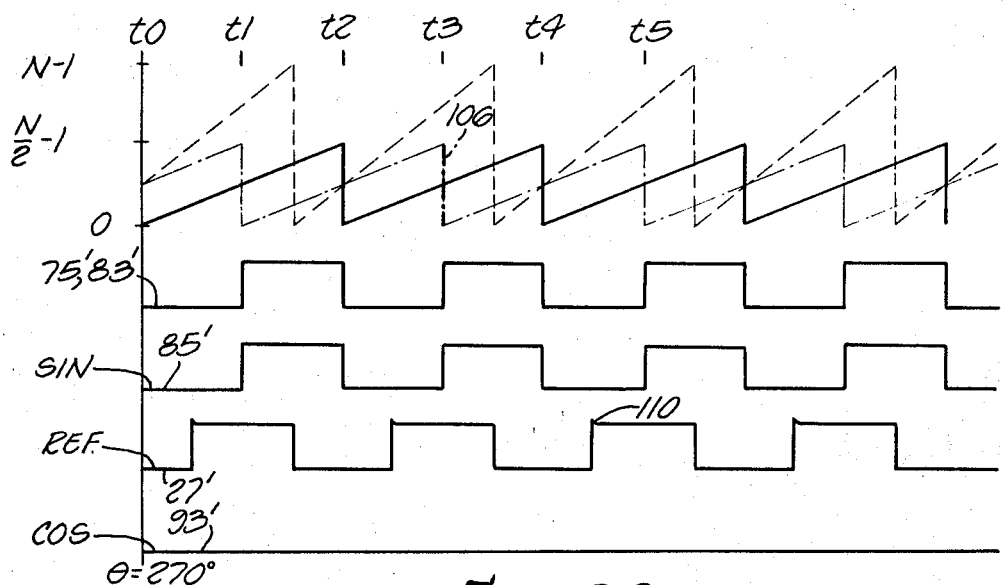
Figure 6G:
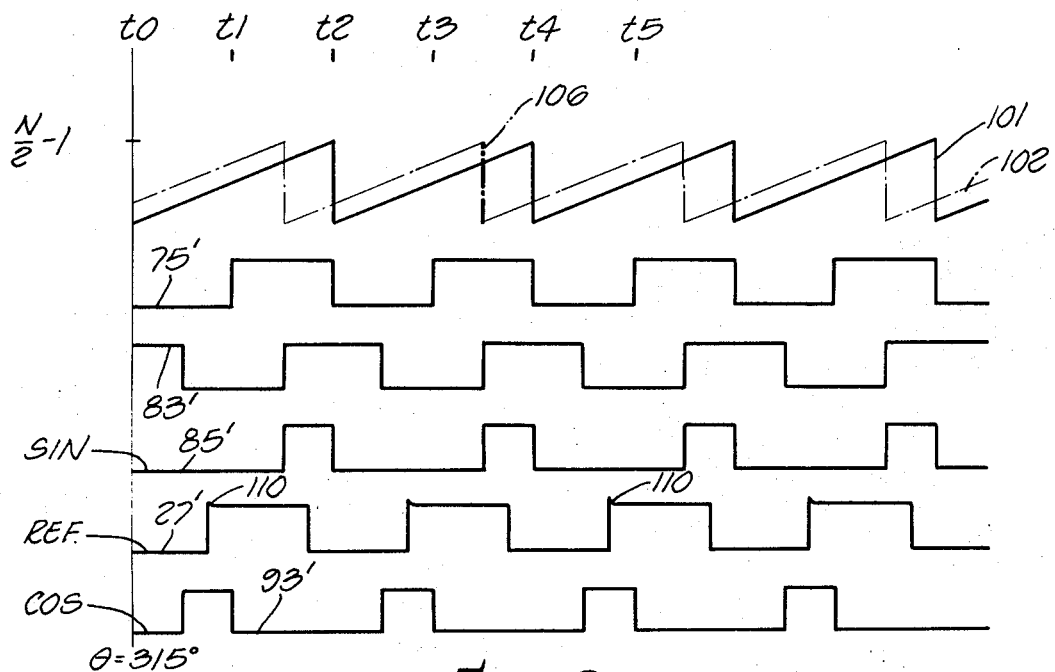

Note particularly, in comparing FIG. 6(g) with FIG. 6(c), that the pulse width and frequency of the sine signal represented by waveform 85' in FIG. 6(c) and FIG. 6(g) is identical with the pulse width and frequency of the cosine signal represented by waveform 93' in FIG. 6(c) and in FIG. 6(g). Note, however, that the reference marker 110 in FIG. 6(c) is positioned beneath the center of the positive-going portion of the waveforms 85' and 93' whereas, in FIG. 6(g), the marker 110 is positioned near the center of the negative-going portion of waveform 85' but is still near the center of the positive-going portion of waveform 93'. The position of the reference marker 110 in FIG. 6(g) indicates that the value of the sine at 315° is, although equal in magnitude to the value of the sine at 45°, of opposite sign. Similarly, the position of the reference marker with respect to the cosine signal represented by waveform 93' of FIG. 6(c) indicates that the cosine of 45° is equal in magnitude and sign to the cosine signal at 315° represented by waveform 93' of FIG. 6(g).

In all of the FIGS. 6(a) through 6(g), the initial synchronous reset position or reset time of the counter 12 is designated by a heavy bar 106. As the stepping pulses are inhibited from the counter 12 so as to change $\theta$ to a desired value, the heavy bar 106 is delayed further and further beyond the initial t0 starting point of the waveform 101. In particular, in FIG. 6(e), the counter 12 has been delayed one full count range of 1,000 so that the waveforms 101 and 102 are again superpositioned and the heavy bar 106 is one full counter cycle later, at t2, than the initial t0 starting position. Further inhibiting of stepping pulses to counter 12 causes the heavy bar 106 to be delayed through the second cycle of the waveform 101 as shown in FIGS. 6(f) and 6(g).

AUTOMATIC CONTROL FOR INHIBIT EMBODIMENT

FIG. 7 depicts one preferred automatic embodiment of the control 4 in FIGS. 1 and 2. For automatic operation such as in a servo system, the FIG. 7 circuitry is preferably substituted for the manual embodiment of control 4 in FIG. 5. The FIG. 7 embodiment of control 4 of FIG. 2 generates the $U/D_N$ signal on line 48, the $\overline{U/D_N}$ signal on line 49 and the $\overline{RCT_N}$ signal on line 5, all of which connect to like-numbered lines in FIG. 5 in place of the like-numbered lines from the control 4 in FIG. 5. The FIG. 7 circuit generates the $U/D_N$, $\overline{U/D_N}$ and $\overline{RCT_N}$ signals by sampling the sign of a first system control signal e, as it appears on line 116 and the magnitude of a second system control signal, Es, as it appears on line 117. The e and Es signals may be derived, for example, from a digital readout servo system as shown in FIG. 14 to be described hereinafter. Such a servo system is also shown in the above-identified application, Ser. No. 809,533, which in its entirety is hereby incorporated by reference in this specification for the purpose of teaching the details of operation of a servo system which generates e and Es control signals.

By way of summary, a system which generates $e$ and $Es$ system control signals typically includes a data element, such as an Inductosyn, which develops an error signal as an output. The error signal is generated as a result of amplitude modulated signals input to the data element. The signals on lines 85 and 93 in FIG. 5 are typically used as inputs to a data element. The output error signal is analog in nature and contains information indicative of the displacement of the relatively movable members of the data element from the null position as well as information indicative of the direction from null that the displacement has occurred.

In order to form an indication of the magnitude of the displacement from null, the error signal is rectified and filtered to form the second system control signal, $Es$, in the form of a dc level where the magnitude of the dc level is proportional to the magnitude of the displacement from null. In order to develop an indication of the direction from null, the data element output error signal is phase-detected to form the first system control signal $e$. That phase-detection makes use of the output from the reference generator as it appears, for example, on the line line 27 from the reference counter 96 in FIG. 5. The phase-detected signal may also be filtered to provide a dc signal where the direction from null is indicated by the dc signal's polarity above or below a threshold level and hence is conveniently called a polarity signal. When the polarity signal changes polarity from a level above the threshold level to a level below the threshold level, that change in polarity is an indication that the relatively movable members of the data element have traversed from a position on one side of null through the null to a position on the other side of null so that a reversal in the polarity occurs. In actual practice, however, the output from the phase-detector exhibits an ac component superimposed upon the dc polarity signal which ac component may cause the polarity signal to actually reverse polarity before the relatively movable members have traversed through null. The nature of the component is such that it is only a significant factor when the relatively movable members are very close to the null position. Because measuring and controlling systems are designed to operate around the null, elimination of the reversals in polarity caused by the ac component is desirable.

The ac component appearing in the error signal from the data element and therefore also in the first system control signal $e$ can be traced to the frequencies used to generate the input signals to the data element which are of frequency F and which are derived as a count down from source 21 as they appear on lines 85 and 93 in FIG. 5. By sampling the first system control signal at a frequency of F, or less, at times which are time related to the sine a cosine signals (e.g., through reference generator 96 of FIG. 5), polarity reversals caused by the ac component superimposed over the dc polarity signal can be minimized. The manner in which the first system control signal, $e$, is sampled by the control 4 within the present invention will be described further in connection with the Schmitt trigger 119 and the null crossover detector 123.

With reference to FIG. 7, line 116, containing the first system control signal $e$, is connected to a conventional Schmitt trigger 119 which is operative, in a conventional manner, to switch its output from a "0" to a "1" and from a "1" to "0" when the input on line 116 goes above or goes below a threshold level, respectively. The threshold level for the present invention, is conveniently set at the zero voltage level so that when line 116 is above zero (also known as "null") trigger 119 has a "1" on line 121 and when below zero a "0" is on line 121. The output from the trigger 119 is connected via line 121 to the null crossover detector 123.

In the null crossover detector 123, JK flip-flops 125 and 126, as well as the other flip-flops in FIG. 7 and the other flip-flops throughout this specification, are conventional bistable devices. For convenience, a summary of the operation of typical master-slave JK flip-flops, as employed in preferred embodiments of the present invention, is provided in the next two paragraphs.

JK flip-flops include J and K inputs, Q and $\overline{Q}$ outputs, a clock or strobe input S, a set input $a$ and a reset input $b$. The flip-flops are operative to have a "1" for output Q while the $\overline{Q}$ output is a "0" when the flip-flops are in the set state and a "0" at Q and a "1" at $\overline{Q}$ in the reset state. The flip-flops are set or reset by applying "1" or "0" signals to the J and K inputs at a time when the strobe input S is "1" followed by a switching of S from "1" to "0", that is, when the strobe input S exhibits a negative-going signal. If both J and K inputs are or have been "1's", at a time when input S is "1", the negative-going signal applied when S goes from "1" to "0" causes the outputs Q and $\overline{Q}$ to complement. When both J and K inputs are "0's" during all the time that input S is "1", the flip-flop Q and $\overline{Q}$ outputs remain the same at strobe time when S goes from "1" to "0". If either (but not both) the J or the K input is "1" at any time that S is "1" and thereafter S goes from "1" to "0", then the Q or the $\overline{Q}$ output is switched to "1", respectively, and the other output is switched to "0".

In addition to the J and K inputs the flip-flops also include set and reset inputs $a$ and $b$, respectively, which may or may not be used as required. For example, in connection with flip-flop 142 in FIG. 7, a "0" on reset input 142 ($b$) functions to switch and hold, independent of J, K and S inputs, the $\overline{Q}$ output to "1". A "1" on input 142($b$) allows flip-flop 142 to operate as described in the preceding paragraph.

Some of the flip-flops used in the present invention always have their J or K inputs always maintained as "1" or "0" as indicated by the "1" and "0" notation adjacent thereto in the drawings. For example, in FIG. 7, flip-flop 147 always has its K input a "1" and flip-flop 158 always has its K input a "0".

Null crossover detector 123 includes two conventional shift register stages comprised of JK flip-flops 125 and 126. The input, J, of flip-flop 125 is connected to the output 121 of trigger 119. Conventional inverter 128 supplies output 121 to the K input of the flip-flop 125. Accordingly, flip-flop 125 is set or reset at strobe time (strobe time occurs when there is a negative-going pulse at input S), as a function of whether the second system control signal on line 116 is above or below the reference voltage level. Flip-flop 125 is set or reset only at a time when it receives an input pulse on line 129 from the strobe generator 131. The operation of the strobe generator 131 will be discussed in more detail hereinafter.

The output signals on lines 6, consisting of the $U/D_N$ signal on line 48 and the $\overline{U/D_N}$ signal on line 49, are derived from the Q output and $\overline{Q}$ output, respectively, of the flip-flop 125. The second flip-flop 126 in null crossover detector 123 functions, as discussed hereinafter in connection with the external output generator 133, to eliminate from external signals the indication of oscillations of the FIG. 7 circuit about the reference level of trigger 119 which occurs when the relatively movable members of a data element oscillate about null. Briefly, flip-flop 126 has its J and K inputs connected to lines 48 and 49, respectively. Like the flip-flop 125, flip-flop 126 is only switched when a negative-going $U/D_S$ pulse is received on line 129 from the synchronous strobe 131.

The second system control signal, $E_s$, on line 117, which is an analog signal and which may vary in amplitude over an analog range, is connected to a conventional variable frequency oscillator 135 which in turn is connected via line 139 to timing circuitry 137' (including flip-flops 142 and 147 and AND gate 140). The oscillator 135 and the timing circuitry 137' together comprise the pulse rate generator 137. The variable frequency oscillator 135 generates rectangular wave pulses, appearing on line 139, which have a frequency proportional to the magnitude of the input signal on line 117 and which increase in frequency the greater the magnitude and decrease in frequency the lower the magnitude of that signal. The pulses on line 139 are purely digital oscillator pulses having a frequency proportional to the magnitude of the system control signal, $E_s$. Line 139 is connected as one input to the conventional AND gate 140 and as a reset input 142 (b) to a conventional JK flip-flop 142. Flip-flop 142 supplies via its $\overline{Q}$ output another input to AND gate 140 via line 144. The one remaining input to AND gate 140 is from line 60 derived from the counter 54 of FIG. 5. Line 60 carries a 2MHz stepping pulse signal. When AND gate 140 is satisfied by "1's" on all lines 139, 144, and 60, it generates a "1" on line 146 connected to the flip-flop 147 J input and to the strobe input, S, thereby conditioning flip-flop 147 to be set when line 146 goes from "1" to "0", that is, set with the Q output "1". Flip-flop 147 develops the $RCT_N$ pulses on the Q output connected to line 149 which is, in turn, connected to the J and S inputs of the flip-flop 142. The $\overline{Q}$ output of flip-flop 147 develops the $\overline{RCT_N}$ pulses on output line 5. The $\overline{RCT_N}$ pulses are operating pulses having a frequency proportional to the magnitude of the signal $E_s$.

The effect of the pulse rate generator 137 is to generate one digital operating pulse ($\overline{RCT_N}$ pulse) on line 5, of two $\overline{1CT}$ pulse periods in duration, each time there is a coincidence of a pulse ("1") on line 139 with a $\overline{1CT}$ pulse ("1") on line 60.

The function of the strobe generator 131 is to deliver a strobe pulse on line 129 to the null crossover detector 123 at times when no $RCT_N$ pulses are present and in timed relation with the sine and cosine signals on lines 85 and 93 as provided by the pulses on line 27 of FIG. 5. In FIG. 7, the signal on line 27 is divided by 4 in conventional divider 156 to produce a 500Hz signal on line 155. The synchronously derived strobe pulses on line 129 are generated by AND gate 153. AND gate 153 derives inputs from the $\overline{RCT_N}$ signal on line 5, from the 4MHz source signal on line 52, from the 500Hz signal on line 155 and from the $\overline{Q}$ output of flip-flop 158 on line 159. Flip-flop 158 is reset whenever a "0" is present on line 155 and is set at other times by AND gate 153 whenever AND gate 153 has conditioned flip-flop 158 with a "1" on input J while AND gate 160 applies a "1" followed by a negative-going strobe pulse via its output 161 to the S input of flip-flop 158. AND gate 160 is satisfied when both line 52 and line 61 are "1's".

The external output generator 133 derives, in EXCLUSIVE-OR gate 164, the EXCLUSIVE-OR function of the Q output of flip-flop 126, appearing on line 162, from the null crossover detector 123 and the Q output of flip-flop 125, appearing as the $U/D_N$ signal on line 48. The Q output of flip-flop 126 registers, at any given point in time, the "1" or "0" condition which appeared at the Q output of flip-flop 125 at a time prior to the latest strobe pulse received on line 129. Each time a strobe pulse is received on line 129 the "1" or "0" level of line 48 is transferred to line 162. The operation of flip-flops 125 and 126, is, of course, that of a shift-register shifted once for each strobe pulse on line 129. The EXCLUSIVE-OR gate 164 output is connected as an input to conventional NOR gate 167 via line 165. NOR gate 167 forms the $RCT_X$ output on line 168 when the line 165 and the line 5 are both "0's". External output generator 133 functions to invert $\overline{RCT_N}$ pulses through NOR gate 167 to form $RCT_X$ pulses only when line 165 is a "0" and to inhibit $\overline{RCT_N}$ pulses when line 165 is a "1". Line 165 is a "0" only when the level on line 48 is simultaneously the same as the level on line 162 which means that the trigger 119 was the same at the last two strobe times. If line 165 is a "1", it means that trigger 119 detected a change in direction at the last strobe time as compared with the previous strobe time. Since it is normal for a servo system, in many embodiments, to position itself at the null, trigger 119 commonly switches states at each strobe pulse time thereby causing the $U/D_N$ and $\overline{U/D_N}$ signals to correspondingly switch states. Since it is often undesirable for display devices or other external devices to switch states when in fact the servo system is "sitting at null", generator 133 eliminates such oscillations by assuring that an output will only occur when two successive strobe pulses indicate change is occurring in the same direction, that is, when line 165 is "0".

OPERATION OF AUTOMATIC CONTROL FOR INHIBIT EMBODIMENT

Figure 8:
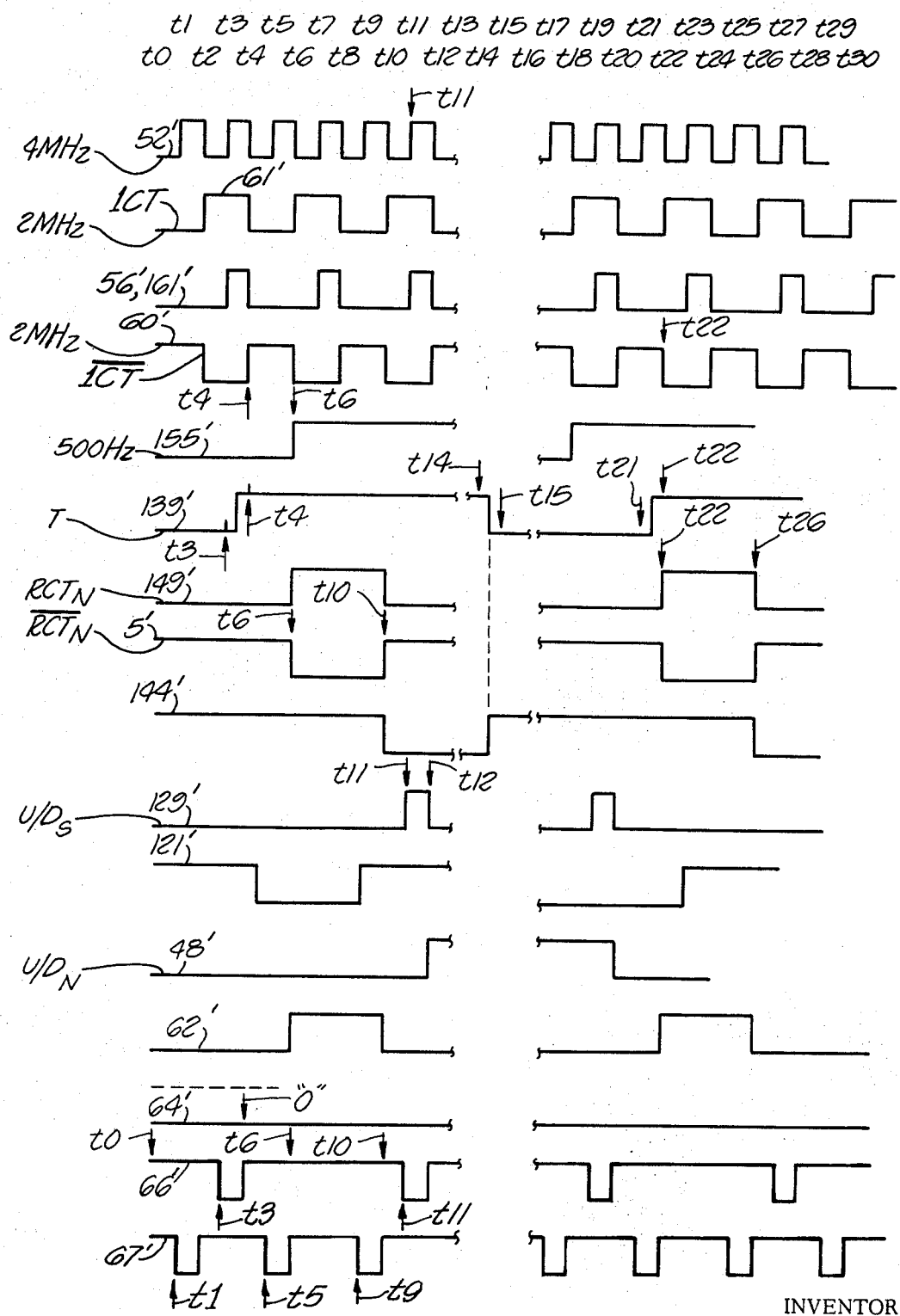
FIG. 8 depicts timing waveforms indicative of the operation of the FIG. 7 automatic control.

The operation of the FIG. 7 automatic control for use with the FIG. 5 inhibit embodiment of a converter, in accordance with the present invention, is conveniently explained with reference to the waveforms of FIG. 8. The waveforms of FIG. 8 are numbered with a prime added to correspond with the like-numbered signal lines in FIGS. 7 and 5. For example, the first waveform 52' corresponds to the input on line 52 to the strobe generator 131, as that input is derived from FIG. 5.

In operation, the null crossover detector 123 detects on line 121 the "1" or "0" indication of the trigger 119, as previously explained, thereby sensing whether or not the signal on line 116 is above or below a threshold level. The detector 123 only samples line 121 at a time when a synchronously derived strobe pulse $U/D_S$ on line 129 goes from "1" to "0". The strobe pulse on line 129 is generated by strobe generator 131.

In FIG. 8, the waveforms 52', 61' and 161' show the relationship between the signals on the like-numbered lines (without primes) of the strobe generator 131. Because the 500Hz signal on line 155 is one input to the AND gate 153, the strobe pulses on line 129 cannot occur at greater than the 500Hz frequency. More particularly, flip-flop 158 via line 159 inhibits AND gate 153 from generating a strobe pulse whenever its $\overline{Q}$ output is a "0". When a 500Hz pulse on line 155 is a "0", flip-flop 158 is reset enabling input 159 to AND gate 153 but while the signal on 155 remains "0", AND gate 153 is unsatisfied. When the 500Hz signal on line 155 goes positive, as shown at t6 of waveform 155' in FIG. 8, after flip-flop 158 has been reset, AND gate 153 is satisfied on the next positive-going clock pulse unless an inhibiting signal in the form of an $\overline{RCT}_N$ pulse on line 5 is present. Such an inhibiting signal on line 5 is present from t6 to t10 of waveform 5'. The next uninhibited positive-going clock pulse appears in waveform 52' at t11 or as a result of AND gate 153 being satisfied at t11 by "1's" in waveforms 5' and 155' and also the "1" from line 159 (not shown as a waveform) as derived from the $\overline{Q}$ output of flip-flop 158. The pulse in waveform 129' between t11 and t12 is seen to be synchronously derived from the source inputs on lines 52 and 61 and is operative to set flip-flop 158 thereby inhibiting AND gate 153 via line 159 until flip-flop 158 has been reset by another "0" on the 500Hz line 155.

By way of summary, therefore, the strobe generator 131 generates a strobe signal on line 129 which causes the null crossover detector 123 to sample the status of the line 121, which state is determined by the first system control signal e on line 116, at times which are in timed relation with the sine and cosine signals on lines 85 and 93 of FIG. 5 but the sampling occurs only at such a time that the $RCT_N$ signal on line 149 is "0" or, as alternatively stated, when the $\overline{RCT}_N$ signal on line 5 is "1". The strobe generator 131 provides a "0" for either the $U/D_N$ signal on line 48 or the $\overline{U/D}_N$ signal on line 49 in order to control which of the counters 11 or 12 in FIG. 5 are to have stepping pulses inhibited therefrom.

Still with reference to FIG. 7, the operation of the pulse rate generator 137 is also conveniently explained with reference to the waveforms 60', 139', 149', 144' and 5' of FIG. 8 which represent the signals on like-numbered lines (absent the primes) in FIG. 7. As previously explained, the second system control signal Es on line 117, an analog signal, causes the variable frequency oscillator 135 to generate a variable frequency purely digital output signal on line 139. The frequency of the pulses on line 139 generally varies over a range from 500Hz to 500KHz. Because of the generally low frequency of the oscillator pulses on line 139 compared with the source pulses, for example on line 52, a break in the waveforms in FIG. 8 at about time t13 and again at about time t16 has been included in order to show representative waveforms.

Note that the first oscillator pulse in waveform 139' occurs arbitrarily between times t3 and t4 and that pulse serves as one input to AND gate 140. Assuming the flip-flops 142 and 147 are initially in the reset condition, as is a normal condition in their cyclic operation as will become clear hereinafter and as shown by waveforms 144' and 5' being "1" between t3 and t4, AND gate 140 is satisfied on the next positive level of the $\overline{ICT}$ pulse in waveform 60' as occurs at time t4. At time t4, the signal on line 146 at the output of gate 140 goes from "0" to "1" but that "0" to "1" transition does not trigger the flip-flop 147, since, as previously explained, JK flip-flops are only toggled on a negative-going transition at the S input. Accordingly, the next negative-going transition in waveform 146' occurs at time t6 when the $\overline{ICT}$ signal in waveform 60' goes negative since AND gate 140 becomes dissatisfied at that time. As shown in waveforms 149' and 5', the $RCT_N$ and $\overline{RCT}_N$ pulses are initiated at t6. The signal on line 146 again goes positive at time t8 when the $\overline{ICT}$ input on line 60' to AND gate 140 again goes positive. Again, flip-flop 147 is not changed at t8 because only a positive-going transition occurs in $\overline{ICT}$. Flip-flop 147 is toggled, however, at time t10 when $\overline{ICT}$ again goes negative. The toggling of flip-flop 147 completes the $RCT_N$ and $\overline{RCT}_N$ pulses which were initiated at time t6. Additionally, switching of $RCT_N$ from "1" to "0" on line 149 causes flip-flop 142 to be toggled thereby resetting the signal on line 144 to "0" and inhibiting further pulses from being transmitted through AND gate 140 until flip-flop 142 is reset at some future time, for example, between t14 and t15 when the waveform 139' goes from "1" to "0" thereby resetting flip-flop 142 via the reset input at 142(b).

When later another oscillator pulse on line 139 has a positive-going transition, as shown between t21 and t22, pulse generator 137 again generates one $RCT_N$ pulse, of two $\overline{ICT}$ pulse periods in duration, starting at a time when the $\overline{ICT}$ signal on line 60 has the next negative-going transition such as is shown at t22. The $RCT_N$ and $\overline{RCT}_N$ pulse widths are, therefore, twice the widths of the positive-going portions of the $ICT$ and $\overline{ICT}$ pulses.

SUMMARY OF INHIBIT EMBODIMENT OPERATION

The combined operation of the FIGS. 5 and 7 circuits is apparent from the FIG. 8 waveforms 48', 56', 60', 61', 62', 64', 66' and 67' which depict typical signals on the like-numbered signal lines in the alteration means 7' of FIG. 5. At time t0 through t6, neither inhibit means provided by NOR gate 45 nor inhibit means provided by NOR gate 46 is operative to inhibit the stepping pulses on lines 56 and 57 from being gated through the NOR gates 59 and 63. By way of example, the waveform 66' is the inversion of the waveform 56' due to the inverting action of NOR gate 59. At the time t7, however, the presence of the negative-going $\overline{RCT}_N$ pulse along with the presence of a $U/D_N$ "0" signal on line 48 causes NOR gate 45 to inhibit one stepping pulse between t7 and t8 on line 56 from being transmitted to the counter 11 on line 66 for two pulse periods of the CK pulses on line 52, that is from t6 to t10.

During the period from t6 to t10 when stepping pulses are inhibited from being applied to counter 11, the inhibit means including NOR gate 63 does not inhibit stepping pulses from the line 57 from being applied to the counter 12 because even though the $\overline{RCT}_N$ signal on line 5 is a "0" input to NOR gate 46, the $\overline{U/D}_N$ signal on line 49 is "1" causing the waveform at 64 to be a "0" thereby passing the stepping pulses through the NOR gate 63.

With reference to the vector diagrams of FIG. 4, the inhibiting of stepping pulses causes, as depicted in FIG. 4(b) for example, the vector V1 representing the count in counter 11 to be displaced from the vector V2 representing the count in counter 12 by a count difference equal to the number of stepping pulses which are inhibited from being applied to the counter 11.

As discussed in connection with the waveforms of FIGS. 6, the difference in the number of stepping pulses applied to one of the counters 11 or 12 with respect to the number of stepping pulses applied to the other of the counters 11 or 12 controls the value of the angle $\theta$ thereby causing the combining means 17 in FIG. 5 to generate the pulse-width modulated output signals on lines 85 and 93.

As a digital-to-analog converter, the inhibit embodiment of FIG. 5 receives a digital input $n$ from FIG. 7 where that input is in the form of a serial train of $n$ pulses and particularly a number of $RCT_N$ pulses equal to $n$. Those $n$ pulses through alteration means 7' are effective to generate a digital count difference of $2n$ between the counts in counters 11 and 12 where counters 11 and 12 are each N/2 counts long. Source 21 generates a signal of NF frequency which is converted to stepping pulses of (NF)/2 frequency by divider 54 in alteration means 7'. For each one of the $n$ $RCT_N$ pulses, one stepping pulse of (NF)/2 frequency is inhibited from one or the other of the counters 11 and 12 of length N/2. Each $RCT_N$ pulse, therefore, changes the count difference by 2 and accordingly $n$ $RCT_N$ pulses change the count difference by $2n$. The frequency of $RCT_N$ pulses with respect to the (NF)/2 frequency of stepping pulses is small. Accordingly, counters 11 and 12 with substantially (NF)/2 frequency stepping pulse inputs generate outputs of frequency F which are relatively phase-shifted by an amount proportional to $2n$. The phase-shifted counter outputs are logically combined to form pulse-width modulated converter analog output signals. Those analog output signals each have a sinusoidal fundamental frequency component exhibiting an amplitude proportional to a sinusoidal function of a constant angle plus the angle $\theta$ where $\theta$ equals $(n/N)360$ degrees. The constant angles are 0° and 90° so as to form sine $\theta$ and sine $(\theta+90)$ functions.

SYMMETRICAL EMBODIMENT

FIG. 9 depicts a second preferred embodiment of the converter of FIG. 2 which is particularly useful in plural axes systems in that the reference generator 26 in FIG. 9, can be stepped directly from a source. Since the generator 26 is stepped directly from a source, one reference generator ma be conveniently shared by a plurality of the FIG. 2 type converters used for other axes, all to be described in more detail hereinafter in connection with FIG. 18.

In FIG. 9, the source 21, the alteration means 7'', the counters 11 and 12, the combining means 17 and the reference generator 26 correspond to the like-numbered devices of FIG. 2 (without primes) and similarly are analogous in function to the like-numbered devices in FIG. 5.

More particularly, the combining means 17 is identical in operation and construction to the combining means 17 in FIG. 5 and accordingly needs no further comment. Additionally, the last two binary stages 71, 71', 72 and 72' in counters 11 and 12 in FIG. 9 are also identical to the like-numbered devices in FIG. 5 and also require no further comment.

The alteration means 7'' in FIG. 9 differ from the alteration means 7' in FIG. 5 in a number of respects. Basically, the alteration means 7'' of FIG. 9 functions to alter the number of stepping pulses, of frequency (NF)/4 appearing on line 215, derived from source 21 via line 210, applied to one of the counters 11 or 12 on line 223 or 224, respectively, with respect to the number of stepping pulses applied to the other of the counters 11 or 12 so as to establish a digital count difference between the counts in the counters 11 and 12. The alteration means 7'' of FIG. 9 alters the number of stepping pulses in a manner such that one of the counters is effectively altered an amount equal to one more than the number of pulses of frequency NF normally spplied thereto, after division by 4, as derived from source 21 while the other of the counters is effectively altered an amount equal to one less than the number of pulses of frequency NF normally applied, after division by 4, thereto as derived from source 21.

In FIG. 9, alteration means 7'' includes a JK flip-flop 201 having its J and K inputs connected to receive the $U/D_N$ signal on line 48(a) and its strobe input, S, connected to receive the $RCT_N$ signal on line 149. The Q output of flip-flop 201 is connected as one input on line 205 to the EXCLUSIVE-OR gate 220. Flip-flop 201 functions to divide by 2 the number of $RCT_N$ pulses on line 149 when line 48(a) is "1".

Flip-flop 203 is analogous to flip-flop 201 and has its J and K inputs connected to receive the $U/D_N$ signal via line 49(a) and its S input connected to receive the $RCT_N$ signal on line 149. The Q output of flip-flop 203 is connected via line 206 as one input to the EXCLUSIVE-OR gate 221. Flip-flop 203 functions to divide by two the $RCT_N$ pulses on line 149 when line 49(a) is "1".

The stepping pulse inputs to EXCLUSIVE-OR gates 220 and 221 are derived from the 1MHz signal on line 215 from the source 21 via the flip-flops 211 and 212. Flip-flop 211 has its J and K inputs connected to receive the $\overline{RCT_N}$ signal on line 5 and its S input connected to the source via line 210. Flip-flop 211 functions to divide by 2 the source pulses on line 210 when line 5 is a "1". The Q output of flip-flop 211 is connected via line 214 to the S input of flip-flop 212. The J and K inputs of flip-flop 212 are maintained at the "1" level and the Q output is connected to line 215. Flip-flops 211 and 212 function to divide by 4 the NF frequency source pulses on line 210 to provide (NF)/4 stepping pulses on line 215 when the $\overline{RCT_N}$ line 5 is a "1".

An initial reset condition in all of the flip-flops 201, 203, 211 and 212 may be established in any conventional manner. For example, flip-flop 234 may be employed with its Q output connected to the reset inputs of those flip-flops. Flip-flop 234 is operative to clear the flip-flops of alteration means 7'' whenever line 225 is a "0". Counters 11, 12, and 96 use the $\overline{Q}$ output of flip-flop 234, in a preferred embodiment, since they require a "1" to clear because of an internal inverting circuit.

The EXCLUSIVE-OR gates 220 and 221 are connected via lines 223 and 224 to the counters 11 and 12, respectively. Counters 11 and 12 include first stages 226 and 226', respectively, which function to divide the stepping pulses on lines 223 and 224, respectively, by 125. Stages 226 and 226' replace the 250 count stages 70 and 70' in the FIG. 5 counters 11 and 12.

In comparing the FIG. 9 circuitry with the FIG. 5 circuitry, it is apparent that the alteration means 7' in FIG. 5 divides the 4MHz source signal on line 52 by two and counters 11 and 12 further divide the source signal by 1,000 for a total division of 2,000. In the FIG. 9 circuit, the alteration means 7'' divides the 4Hz signal on line 210 by 4, deriving the 1MHz signal on line 215 and the counters 11 and 12 further divide that signal by 500 for a total division in FIG. 9 of 2,000 which is equal to the FIG. 5 total division. Accordingly, the output signals on lines 85 and 93 in FIGS. 5 and 9 are 2KHz signals, and, of course, have pulse widths proportional to the sine and cosine functions of the difference in count between counters 11 and 12.

Reference generator 26, as previously indicated is stepped directly, via line 210, by the source 21 and includes a 2,000 count counter 96 which may be reset in a conventional manner by the $\overline{Q}$ output of flip-flop 234. Similarly, the counter stages 71, 71', 72, 72', 226 and 226' may also be reset by the $\overline{Q}$ output of flip-flop 234. Counter 96 develops a 2KHz output on line 228. For convenience in analyzing the operation of the FIG. 9 circuitry, counter 96 may include an output 230 of frequency 1MHz which is equivalent to the signal on line 210 divided by 4 as will be used for purposes of comparison in connection with FIG. 12. Counter 96 also includes an output 231 which supplies a 500Hz signal, in a manner like that discussed in connection with counter 156 of FIG. 7, which is used in FIG. 10 as described hereinafter.

AUTOMATIC CONTROL FOR SYMMETRICAL EMBODIMENT

FIG. 10 depicts another preferred automatic embodiment of the control 4 in FIG. 1 adapted specifically for use with the FIG. 9 circuitry. The control 4 of FIG. 2 is illustrated by the embodiments of FIG. 7 and FIG. 10.

The FIG. 10 automatic control includes a null crossover detector 123 with a Schmitt trigger 119 connected to receive the first system control signal $e$ on line 116, all identical in number and operation to the like-numbered devices of FIG. 7.

The output $U/D_N$ and $\overline{U/D_N}$ of the null crossover detector 123 on lines 48 and 49 are also identical to the FIG. 7 circuitry as is the external output generator 133. The generator 133 generates, on line 168, the $RCT_x$ signal which may, for convenience, be amplified in a conventional amplifier 257 to deliver the $RCT_X$ signal on line 168($a$).

The FIG. 10 control differs from the control of FIG. 7 in that it includes a multiplex module 258 which may be conventional in construction and which is shown herein as including four stages, A, B, C and D. Such a multiplex module is, for example, the "8266 2-INPUT, 4-BIT DIGITAL MULTIPLEXER" of the Signetics DCL line of integrated circuits marketed by Signetics Corporation. Each of the stages of the multiplex module 258 includes an X and Y input and a Z output and all of the modules are interconnected with S0 and S1 control inputs. Each of the stages in the module 258 function to connect the Y input to the respective Z output when S0 is a "0" and to connect the X inputs to the respective Z outputs when S0 control input is a "1". S1 is always tied to "0". The small circle connected at some of the inputs and outputs of the stages designates that the signal is inverted at that point. If a circle appears both at the input and the output, then, of course, two inversions occur and accordingly the signal is transmitted through the module as if no inversion occurred. For example, Stage A has a circle on the Y input and the Z output and no circle on the X input. Therefore, multiplex module A functions to invert the X input whenever S0 is a "1" or to transmit the Y input to output line 252 when S0 is a "0" as if no inversion occurred.

Multiplexing module 258 is provided so that the signals on lines 48($a$), 49($a$) and 252 may be derived from internal circuitry on lines 48, 49 and 232 or external circuitry on lines 260 and 261. Line 260 provides the $U/D_x$ signals and line 261 the $\overline{FR}$ signal. The $\overline{FR}$ signal on line 261 is derived, for example, for an external voltage controlled oscillator analogous to the variable frequency oscillator 135. Both the $U/D_x$ and $\overline{FR}$ signals may be derived from any digital source such as a computer. The selection of lines 48, 49 and 232 or lines 260 and 261 is a function of the "1" or "0" condition of the F signal on line 262 which is connected to the S0 input of multiplex module 258. The F signal on line 262 is typically generated by any conventional control or panel switch (not shown) with which the present invention is used.

The signal on line 117 is connected as an input to variable frequency oscillator 135' which is analogous to the like numbered device of FIG. 5 except that its frequency range is approximately 0 to 500KHz. The output from the variable frequency oscillator 135' appearing on line 139 is connected as one input to the EXCLUSIVE-OR gate 233. A 500Hz signal on line 231 is the other input to EXCLUSIVE-OR gate 233. EXCLUSIVE-OR gate 233 has its output on line 232 connected as an input to the Y input of Stage A of multiplex module 258. The function of the EXCLUSIVE-OR gate 233 is to form the EXCLUSIVE-OR function of the variable frequency oscillator 135 output, which has a frequency range from 0 to approximately 500KHz, with the 500Hz signal. The EXCLUSIVE-OR gate 233 effectively sums the signals on lines 231 and 139 so that when the second system control signal Es causes the variable frequency oscillator 135' to have its output signal on line 139 go to a frequency of essentially 0Hz the output signal from the EXCLUSIVE-OR gate 233 on line 232 is essentially 500Hz. When the apparatus of FIG. 10 is in a system including a data element which produces an error signal from which the second system signal Es is derived, the output frequency from variable frequency oscillator 135' is controlled by the relative position of the relatively movable members of the data element. When the relatively movable members are positioned near the null, the oscillator 135' output frequency goes to 0 and the signal on line 232 is approximately 500Hz. Furthermore, it should be noted at this point that the 500Hz signal on line 231 which is duplicated on line 32 is derived directly from the reference counter 96 in FIG. 9 so that that 500Hz signal is synchronously derived from the source 21 and also has a timed relation to the sine and cosine signals on lines 85 and 93 of FIG. 9. It is clear therefore that whenever there is an error signal derived from the data element in a system such that the second system signal causes the variable frequency oscillator 135' to have an output, the signal on line 232 is asynchronous with respect to the source 21 of FIG. 9 due to the contribution of the variable frequency oscillator 135'. Whenever the data element has its relatively movable members positioned at the null, however, the signal on line 232 ceases to be asynchronous with respect to source 21 and become synchronously derived therefrom and time related to the sine and cosine signals.

Line 252 connected to the Z output of stage A of multiplex module 258 is connected to either the signal on line 232 or to the signal on line 261. The signal on line 252 is connected as one input to the combination strobe generator and timing circuitry 265. The combination strobe generator and timing circuitry 265 in FIG. 10 functions to combine the operations of the timing circuitry 137' and the strobe generator 131 in FIG. 7. The variable frequency oscillator 135' coupled with the EXCLUSIVE-OR gate 233 taken in combination with the combination strobe generator and timing circuitry 265, all in FIG. 10, are analogous to the pulse rate generator 137 in FIG. 7.

In FIG. 10, the combination strobe generator and timing circuitry 265 includes a NOR gate 268 having one input from line 252 and the other input from the $\overline{Q}$ output of flip-flop 273 via line 293. NOR gate 268 has its output connected to the K input of a JK flip-flop 267. Flip-flop 267 has its J input also connected to line 252 and its S input connected to line 210 derived from source 21 in FIG. 9.

The reset input of flip-flop 267 is connected to the TI$_X$ signal on line 208, which may be derived from an external control such as external control logic 309 of FIG. 14. The Q output on line 292 of flip-flop 267 is connected to the reset inputs 271b, 272b, and 273b of three flip-flops 271, 272 and 273. Flip-flop 273 has its S input connected to the source line 210, its K input connected to "0" and its $\overline{Q}$ output on line 293 connected as the other input to NOR gate 268 and to the J inputs of flip-flops 271 and 272. The J input of flip-flop 273 is connected to line 149. Flip-flop 272 has its K input connected to "1", its S input derived from Q of flip-flop 271 and its J input connected to line 293 and to the $\overline{Q}$ output of flip-flop 273 and its Q output connected via line 278 to gates 275 and 283. Flip-flop 271 has its J input connected via line 293 to the $\overline{Q}$ output of flip-flop 273 and its K input connected to a "1".

The Q outputs of flip-flops 271 and 272 are connected as different inputs to a NAND gate 275 via lines 277 and 278, respectively. The $\overline{Q}$ output of flip-flop 271 on line 281 and the Q output of flip-flop 272 on line 278 also serve as inputs to the NOR gate 283 which NOR gate develops the strobe signal U/D$_S$ on line 129 which is an input to the null crossover detector 123.

The output of NAND gate 275 on line 5 develops the $\overline{RCT}_N$ pulses on line 5 which connect to the external output generator 133. Line 5 also connects to a conventional inverter 286 which develops the RCT$_N$ pulses on line 149 and which also connects as the J input to the flip-flop 273. The $\overline{Q}$ output from flip-flop 273 is connected to a conventional NAND gate 288. The other input to NAND gate 288 is line 5 and the output of gate 288 on line 291 is RCT'. The RCT' signal is a stretched $\overline{RCT}_N$ signal and is useful for timing purposes in circuitry (not shown) not germane to the present invention.

OPERATION OF SYMMETRICAL EMBODIMENT

The operation of the FIG. 9 symmetrical embodiment of a converter in combination with the FIG. 10 control, in accordance with the present invention, is conveniently explained with reference to the waveforms in FIGS. 11 and 12. The waveforms in FIGS. 11 and 12 are numbered, (with primes added) to correspond with the like-numbered signal lines in FIGS. 9 and 10.

In operation, the null crossover detector 123 detects on line 121 the "1" or "0" indication of the trigger 119, as previously explained, for sensing whether or not the signal on line 116 is above or below a threshold level. The detector 123 only samples line 121 at a time when a synchronously derived U/D$_S$ pulse goes negative on line 129. The U/D$_S$ pulse on line 129 is generated by the generator circuitry 265.

The circuitry 265 is a combination strobe generator and timing circuitry combining the functions of the strobe generator 131 and the timing circuitry 137' in FIG. 7. As previously discussed, line 252 contains a variable frequency rectangular wave signal derived either from external circuitry on line 261 or derived from internal circuitry on line 232 depending upon the status of the F signal on line 262. For the purposes of this explanation, it will be assumed that the line 262 is a "0" so that the line 232 is connected to the line 252. The signal on line 232 is derived from the variable frequency oscillator 135 and the 500Hz signal on line 231 and contains a rectangular wave signal having a frequency between approximately 500Hz and 500KHz depending upon the analog value of the signal on line 117.

Figure 11:
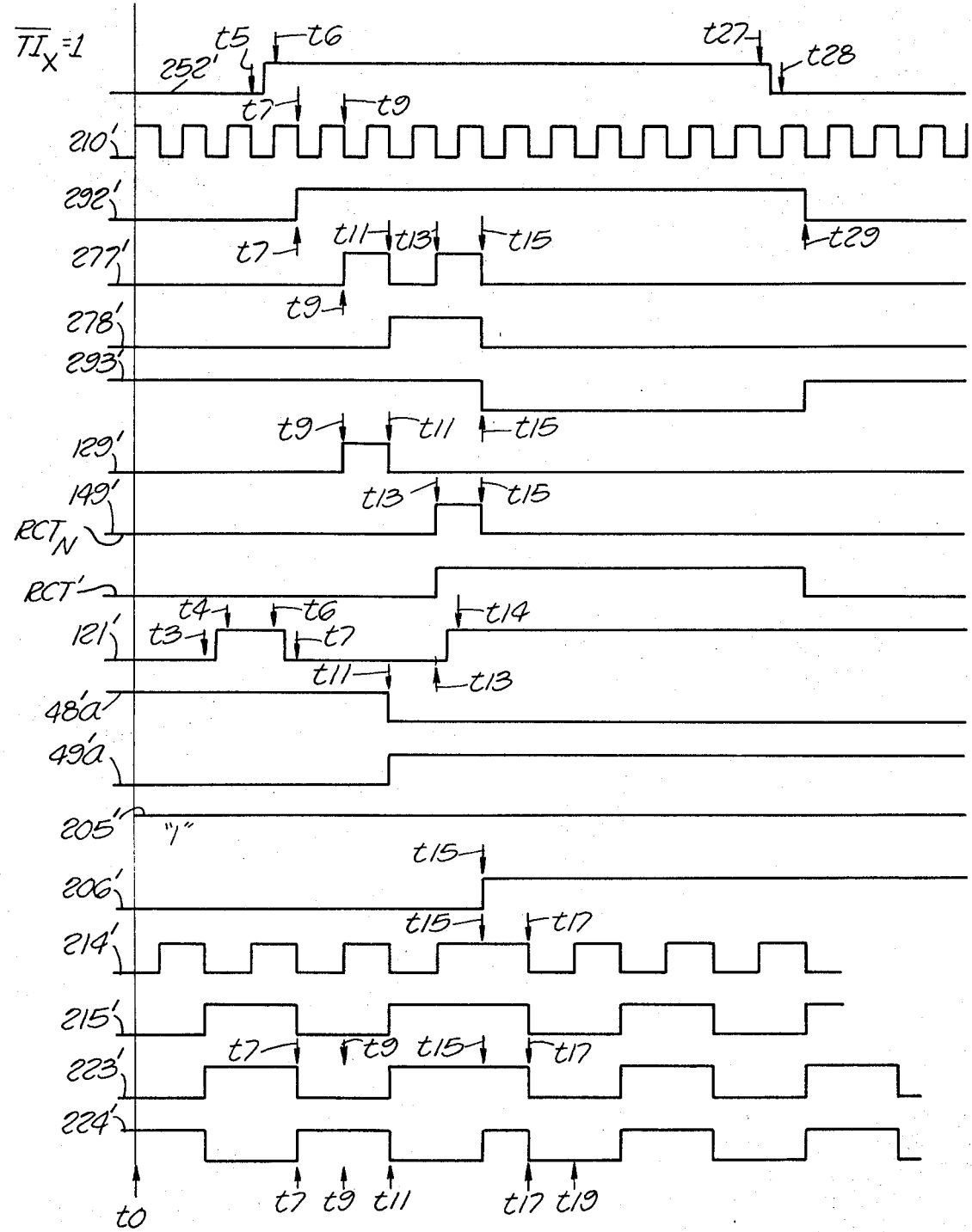
FIGS. 11 and 12 depict waveforms descriptive of the operation of the FIGS. 9 and 10 circuitry.
Figure 12:
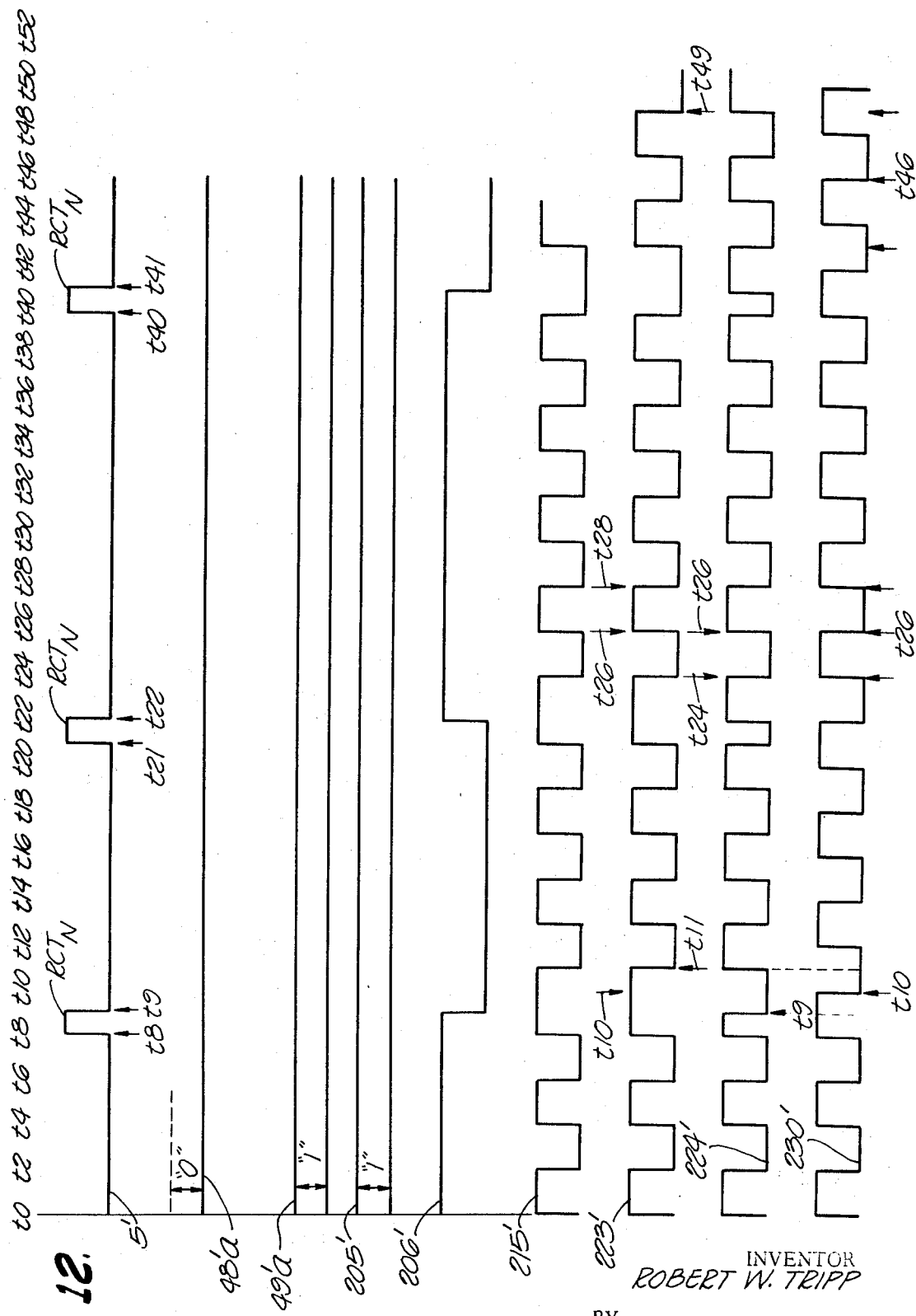

In FIG. 11, it is assumed that flip-flops 267, 271, 272 and 273 have been reset prior to $t0$ and that the 4MHz source pulses on line 210 are being received as shown in waveform 210'. The signal on line 208 is maintained at a "1" and at some arbitrary time, as shown between $t5$ and $t6$, a positive-going pulse is received in waveform 252'. Since it was assumed that prior to $t0$ the flip-flop 273 was reset by flip-flop 267, NOR gate 268 has a "1" on input line 293 thereby inhibiting the oscillator pulse in waveform 252' between $t5$ and $t6$ from being passed through NOR gate 268 to flip-flop 267. That pulse in waveform 252' is applied, however, to the J input of flip-flop 267 so that on the next negative-going pulse on line 210, as occurs at $t7$, flip-flop 267 is set as shown by the positive-going transition in the waveform 292' at $t7$.

The "1" level on the line 292 removes the reset pulse from the flip-flops 271, 272 and 273 so that the next negative-going pulse on line 210, as occurs at $t9$, causes the flip-flop 271 to switch, as shown by the positive-going transition in waveform 277' at $t9$. This switch of the flip-flop 271 at $t9$ supplies a "0" via line 281 to the NOR gate 283 which combined with the "0" on line 278 satisfies NOR gate 283, thereby causing a U/D$_S$ pulse to appear on line 129, as shown at $t9$ in the waveform 129'.

At t9, NAND gate 275 remains unsatisfied and the signal on line 5 remains a "1" which is inverted by inverter 286 and appears as a "0" on line 149. Accordingly, the "0" on the J input of flip-flop 273 at t9 assures that flip-flop 273 remains reset. Since flip-flop 273 is reset, line 293 remains a "1" and therefore the next negative-going pulse on line 210 causes flip-flop 271 to complement changing its state from "1" to "0" as shown in waveform 277 at t11. That negative-going signal on line 277 causes flip-flop 272 to complement as shown at t11 in waveform 278'. The "1" on line 278 at t11 causes NOR 283 to become unsatisfied thereby terminating at t11 the U/D$_S$ pulse on line 129.

At t11, NAND gate 275 is still unsatisfied so that as before, flip-flop 273 remains reset supplying, via line 293, "1's" to the J inputs of flip-flops 271 and 272. Accordingly, the next negative-going pulse on line 210 again causes flip-flop 271 to switch as indicated by the transition in waveform 277' at t13. At t13, the signals on lines 277 and 278 are both "1's" so that NAND gate 275 becomes satisfied causing line 5 to go to "0" and therefore line 149 to go to "1", thereby initiating an RCT$_N$ pulse, on line 149. The "1" level on line 149 is supplied to flip-flop 273 so that the next negative-going pulse on line 210, at shown at t15, causes flip-flop 273 to switch thereby causing line 293 to go from "1" to "0".

Just prior to t15, both flip-flops 271 and 272 have "1" inputs on all J and K inputs so that the negative-going pulse applied on line 210 causes flip-flop 271 to complement thereby causing line 277 to have a negative-going pulse which in turn causes flip-flop 272 to complement. It is evident, therefore, that after t15 both of the flip-flops 271 and 272 are in the reset condition but flip-flop 273 is set maintaining a "0" on line 293 which will inhibit further changes in flip-flops 271 and 272 until line 293 again is "1". The circuitry 265 remains unchanged until after the oscillator pulse on line 252 is terminated between t27 and t28. The "0" level of the line 252, coupled with the "0" on line 293, satisfies the NOR gate 268 causing NOR gate 268 to provide a "1" at the K input to flip-flop 267 which input causes flip-flop 267 to switch at the next negative-going input on line 210 as occurs at t29. The switching of flip-flop 267 at t29 causes the line 292 to be "0" thereby holding flip-flops 271, 272 and 273 reset until such time as a positive-going oscillator pulse on line 252 again sets flip-flop 267 in a manner previously described with respect to time t7.

By way of summary, the FIG. 10 circuitry operates to generate one and only one RCT$_N$ pulse in waveform 149' of FIG. 11 of one source pulse period (one period of waveform 210') in duration for each oscillator pulse received on line 252. Similarly, the circuitry 265 generates one U/D$_S$ pulse, having a duration of one waveform 210' period, on line 129 for strobing the null crossover detector 123 for each oscillator pulse received on line 252. The time of that pulse on line 129 is synchronously derived from the source 21 and may or may not have a timed relation to the sine and cosine signals of FIG. 9. When the signal on line 117 indicates the relatively movable members of the data element are near null, the signal on line 252 goes to a synchronously derived 500Hz which, therefore, has a timed relationship to the sine and cosine signals on lines 85 and 93 of FIG. 9. Since the circuitry 265 generates one U/D$_S$ pulse for each pulse on line 252, the U/D$_S$ pulses will have the timed relation to the sine and cosine signals when the system is at or near null. As previously explained, this timed relation aids in eliminating polarity reversals due to an ac component superimposed over the dc level of the signal on line 116. When the system is not near null, the ac component is not significant and the non-timed (asynchronous) relationship of the signal on line 252 is immaterial.

The operation of the alteration means 7" in FIG. 9 in response to the waveforms on lines 5, 48(a), 49(a), 149 and 210, is readily understood with reference to the remaining waveforms 205', 206', 214', 215', 223' and 224' of FIG. 11. Assuming for the purpose of illustrating a typical example, that the signal from trigger 119, as shown in waveform 121', has switched from "0" to "1" between t3 and t4, from "1" to "0" between t6 and t7, and again from "0" to "1" between t13 and t14, the signal on line 48(a) switches from "1" to "0" only at t11 which is the time of the negative-going portion of the strobe signal on line 129.

With reference to FIG. 9, the "0" on line 48(a) during the negative-going transition of the RCT$_N$ pulse on line 149 at t15 causes flip-flop 201 to maintain its "1" output on line 205. Flip-flop 203, however, has "1" inputs and therefore is caused to complement, at time t15, switching its output at t15 from "0" to "1".

The transitions of the $\overline{RCT_N}$ pulse on line 5 is sensed by flip-flop 211 causing the output line 214 to delay its negative-going transition at time t15 until time t17. This delay in the signal on line 214 is duplicated in the signal on line 215 as shown in the waveforms 214' and 215' in FIG. 11. The waveforms 215' and 205' are passed through EXCLUSIVE-OR gate 220 to form the waveform 223'. Similarly, the waveforms 215' and 206' are passed through EXCLUSIVE-OR gate 221 to form the waveform 224'.

The effect of the alteration means 7" in FIG. 9 is to transmit pulses from source 21 to both the counters 11 and 12 whenever the $\overline{RCT_N}$ signal on line 5 is a "1", that is, in the absence of an RCT$_N$ "1" pulse on line 149. The pulses from source 21 are applied to counters 11 and 12 via line 210 through binary counting stages provided by flip-flops 211 and 212. Counters 11 and 12 count through a range of N/4 and therefore the counts they contain are not represented directly by the vectors V1 and V2 in FIGS. 3 and 4. If counter 11 is lumped together with the EXCLUSIVE-OR combination of flip-flops 201 and 212 then this combination (hereinafter referred to as the combination including counter 11) represents a counter of range N/2 properly represented by vector V1 in FIGS. 3 and 4. In a similar manner, the lumped combination of flip-flops 212 and 203 in combination with counter 12 (the combination hereinafter referred to as the combination including counter 12) represents a counter whose count range N/2 is properly represented by the vector V2 in FIGS. 3 and 4. It should be noted that counter 212 is shared with both the combination including counter 11 and the combination including counter 12.

In the absence of an RCT$_N$ pulse on line 149 the flip-flops 201 and 203 are stable and do not change and the $\overline{RCT_N}$ signal on line 5 is a "1" and accordingly the pulses from source 21 of frequency NF are divided by 2 in the binary stage provided by flip-flop 211 providing an input of frequency NF/2 on line 214 to the flip-flop 212. Effectively, therefore, the combination including counter 11 and the combination including counter 12 each receive an input of frequency NF/2, and each functions to divide that input by N/2 forming output signals on lines 75 and 83 of frequency F.

When an $RCT_N$ pulse is received, one or the other of the binary stages provided by flip-flops 201 or 203 is activated by the presence of a "1" in the $U/D_N$ or $\overline{U/D_N}$ signal, appearing on lines 48(a) or 49(a), while the presence of a "0" on line 5 to flip-flop 211 inhibits any change of state of the shared flip-flop 212. Assuming as a typical example that the $U/D_N$ signal on line 48(a) is a "1", then the combination including counter 11 receives an input which is equivalent to toggling the first stage of an N/2 counter. Accordingly, a "1" input on line 48(a) coupled with the receipt of an $RCT_N$ pulse increments only the combination including counter 11 while the combination including counter 12 is not altered. With reference to FIG. 3 and following the above example of receiving one $RCT_N$ pulse, vector V1 is stepped to the next long line 43 assuming the combination including counter 11 and the combination including counter 12 were previously represented by vectors at 32 and 33, respectively. The reference vector R is stepped to the next short mark 44 at the same time that vector V1 is stepped from 32 to 43.

While the above analysis employing the concept of "combination counters" may be one convenient mode of explanation of the symmetrical embodiment of the present invention, another mode of explanation is also helpful. In FIG. 9, counters 11 and 12 may be considered of length M (where in FIG. 9, M equals N/4). Source 21 generates source pulses of frequency NF. Alteration means 7" includes a counter (consisting of flip-flops 211 and 212) of length L which produces an output on line 215 of stepping pulses of frequency NF/L (equal to NF/4 in FIG. 9). The frequency of the inputs to counters 11 and 12 is therefore NF/L. In order to obtain the desired output frequency of F from the counters 11 and 12, the product of L and M must equal N, which is the case in FIG. 9. In order to obtain the proper relative phase difference between the output signals from counters 11 and 12 (on lines 75 and 83), the stepping pulse inputs on lines 223 and 224, in the FIG. 9 embodiment, also have a relative phase difference. That relative phase difference of the input signals on lines 223 and 224 is measured in increments of source pulses on line 210 and may be between 0 and L times NF. The phase-shift of those inputs will be described hereinafter in more detail in connection with the waveforms of FIG. 11 and FIG. 12.

The symmetry of the relative phase-shift between the stepping pulse inputs to counters 11 and 12 can be observed with reference to the waveforms 223' and 224' in FIG. 11. At times t0 through t13, before the $RCT_N$ pulse on line 149, the waveforms 223' and 224' are such that the negative-going transition of waveform 223' appearing at t7 is one clock pulse period earlier than t9 and the negative-going transition of the waveform 224' at t11 is one clock pulse period later than the clock transition at t9. In the absence of an $RCT_N$ pulse at t13, waveform 223' would have had a negative-going transition at t15, one source pulse period before the existing transition at t17, and waveform 224' would have had a negative-going transition at t19, one source pulse period after the existing transition at t17. The effect of the typical $RCT_N$ pulse is to shift the negative-going transitions on lines 223 and 224 in the opposite directions so that both waveforms 223' and 224' have a negative-going transition at t17. This shift with respect to the clock signal represented by waveform 210' is symmetrical.

The symmetry of operation is still more clearly seen with reference to the waveforms of FIG. 12. In FIG. 12, the $U/D_N$ signal on line 48(a) and the $\overline{U/D_N}$ signal on line 49(a), in a typical example, remain as "0" and "1", respectively, without change so that the output waveform 205' is also not changed. Each of the three $RCT_N$ pulses as shown in waveform 5' cause a corresponding change in the waveform 206. Note that in FIG. 12, the pulse width of the $RCT_N$ pulses (between t8 and t9, t21 and t22, and t40 and t41) are one source pulse period in duration, that is, one period in duration of the waveform of the source on line 210 of FIG. 9.

Note in waveform 215 of FIG. 12, that, for each of the $RCT_N$ pulses, the next transition in waveform 215' is delayed by one source pulse period which is equivalent to phase-shifting by one source pulse period the stepping pulse inputs supplied to both of the counters 11 and 12. In forming the EXCLUSIVE-OR function of waveform 215' with the waveform 205', a waveform identical to waveform 215' appears as waveform 223'. Accordingly, the counter 11 in the alteration means 7" has had the stepping pulse inputs phase-shifted one clock pulse period later in time. By forming the EXCLUSIVE-OR function of the waveform 215' with the waveform 206', the waveform 224' appears to have been phase-shifted one clock pulse period earlier in time.

More particularly, with reference to time t10, waveform 223' has a negative-going transition at t11, one source pulse period after t10 when it normally would have had a negative-going transition. Similarly, waveform 224' has a negative-going transition at t9 which is one source pulse period earlier than t10 when it normally would have had a negative-going transition.

With reference to time 26, after the second $RCT_N$ pulse (between t21 and t22), waveform 223 has its negative-going transition at t28, two source pulse periods later than normally would have been the case and waveform 224' has its negative-going transition at t24, two source pulse periods earlier than normal. In a similar manner, after the third $RCT_N$ pulse (between t40 and t41), waveform 223' has its negative-going transition three source pulse periods later than t46 at t49 and waveform 224' has its negative-going transition three source pulse periods earlier than t46 at t43.

Another way of analyzing the operation of the alteration means 7" in combination with the counters 11 and 12, is to compare the signals on lines 223 and 224 with a signal from line 230, developed after the source pulses on line 210 have been divided by 4, such as is conveniently derived from reference counter 96.

As has been assumed in FIG. 12 for explanatory purposes, the outputs on lines 223 and 224 are in synchronism from t0 through t8 until the first $RCT_N$ pulse is generated. Thereafter, the reference counter output, as depicted in waveform 230', continues to have pulses of a constant periodicity but waveforms 223' and 224' are phase-shifted symmetrically about the negativegoing transitions in waveform 230' at t20, t26, and t46, as previously discussed.

The operation of the combining means 17 in FIG. 9 is essentially identical to the operation of the combining means 17 in FIG. 5. Accordingly, the waveforms of FIGS. 6 are fully descriptive of the operation of the FIG. 9 circuitry when coupled with the following explanatory comments. The waveform 101, in FIG. 6 with reference to the operation of FIG. 9, is representative of the number of stepping pulses applied in FIG. 9 on line 214 to shared stage 212 of the combination including counter 11 compensating for the effect of any $RCT_N$ pulse applied through flip-flop 201. Similarly, waveform 102 is representative of the number of stepping pulses applied on line 214 to shared stage 212 of the combination including counter 12 compensating for the effect of any $RCT_N$ pulses applied to flip-flop 203. The waveform 103 in FIG. 6 is representative of the number of stepping pulses in FIG. 9 applied on line 210 to reference counter 96 and those stepping pulses are, of course, unaffected by any $RCT_N$ pulse.

In the waveforms of FIGS. 6 as they were described connection with FIG. 5, it was tacitly assumed that since counter 11 had no stepping pulses inhibited therefrom, that waveform 101 was in synchronism with real time, as measured for example by source 21, and that both waveforms 102 and 103 were shifted with respect thereto. FIGS. 6 as applied to the FIG. 9 circuit operation, however, require the interpretation that waveform 103 is in synchronism with real time and that waveforms 101 and 102 are shifted with respect thereto.

With the foregoing explanation and assumptions, the waveforms of FIGS. 6 are applicable to both the inhibit embodiment and the symmetrical embodiment of the present invention.

RESET EMBODIMENT

FIG. 13 depicts the converter of FIG. 1 in accordance with a reset embodiment of the present invention. The counters 11 and 12 and the combining means 17 are analogous in operation and function to the like-numbered devices in FIGS. 1, 2 5 and 9. The generation means 7, as shown partially in FIG. 13 and partially in FIG. 14, is a species of the generation means 7 of FIG. 1 and is operative to generate a count difference between the counts in the counters 11 and 12 of FIG. 13 by controlling the times qt which counters 11 and 12 are reset.

The generation means 7 operates using a count-comparison technique where, with reference to FIG. 14, a reference counter 302 (hereinafter called an N-counter) is cyclically stepped by a source of stepping pulses, in the form of clock 301, over a count range from 0 to N−1. Still with reference to FIG. 14, an internal counter 304 (hereinafter called an n-counter) contains a count value of n as established, for example, by recording the number of $RCT_N$ pulses supplied via line 478. In recording the pulses, n-counter 304 acts as a register. The count in the N-counter 302 is compared with the count in the n-counter 304 by means of a comparator 303. Counters 302 and 304 each contain four binary-coded decimal stages, of conventional construction, designated as 485, 486, 487, and 488, and as 492, 493, 494, 491, respectively. Each of those stages is correspondingly compared in conventional comparison stages 496, 496, 497, and 490, respectively, representing the units (U), tens (T), hundreds (H), and thousands (Th) comparisons of the corresponding stages in counters 302 and 304.

Still with reference to FIG. 14, the outputs from comparator 303 in the form of +TU, +H, +Th and −TU−H and −Th signals are supplied to the remainder of the generation means 7, appearing as a portion of FIG. 13. FIG. 13 is an embodiment of the function generator 301 in FIG. 14. The "TU" designation represents the simultaneous presence of a T and of a U coincidence signal as an output from comparator 303.

In FIG. 14, the internal control logic 305 corresponds to the control 4 in FIG. 1. Similarly, the clock 301 corresponds to the source 21 in FIG. 1.

In FIG. 13, the generation means 7, partially shown in FIG. 14, includes thousands counting JK flip-flop 377 which is driven by CRY, the carry information derived in a conventional manner (not shown) from the hundreds decade 494 of the n-counter 304. The flip-flop 377 also receives a clear ($CL_N$) input from the external control logic 309 during the setup mode.

The Q output (A) connected as an input to NAND gate 378, represents an internal count of one thousand each time it goes high. The $\overline{Q}$ output is not used in the embodiment shown. The $\overline{Q}$ output would represent the $\overline{A}$, if used.

The EXCLUSIVE NOR/OR circuit comprised of NAND gates 378 through 381, provides a low output from gate 381 if the reference counter 302 Th output (1) and the flip-flop 377 output (A) agree. If the input counts disagree, the output frame gate 381 is high. The output upon disagreement represents the complemented thousands coincidence, −Th, in the −n channel. The input to gate 381, which is high upon agreement of the input counts, represents the uncomplemented thousands coincidence, +Th, in the +n channel.

Since the +n and −n channel circuitry is in part identical, only the +n channel is described in detail. Primes of the numerical designations used in describing the +n channel are used in designated identical circuitry in the −n channel.

The +n channel comprises NAND gate 382 having coincidence inputs +TU, +H and +Th from comparator 303 of FIG. 14. The output from gate 382 comprises an input to NAND gate 383 which also has inputs from the +TU and $U/D_N$ lines. The output from NAND gate 383 comprises an input to and is inverted by NAND gate 384.

The output from NAND gate 382 also is directed though NAND gates 366 and 392 to provide a signal for clearing JK flip-flops 385, 386, and 387. In addition, the output from gate 392 is inverted by NAND gate 388 which has its output connected to counter 389 to preset the counter to state nine (A B C D stages set respectively as 1001). The B stage of counter 389 is also driven by the output from NAND gate 390 which has inputs from NAND gates 391 and the $\overline{Q}$ output of flip-flop 385. Counter 389 is a decade counter used in a biquinary mode, i.e., a scale of five followed by a scale of two.

Counting is initiated in counter 389 when there is overall coincidence as indicated by simultaneous outputs +TU, +H, +Th from comparator 303 in the +n channel followed by counting signals through NAND gate 383 when coincidence is detected between the tens and units counts of the n-counter 304, and the tens and units counts of the N-counter 302.

Each TU coincidence causes the biquinary counter 389 to increase by a count of 1. If the counting rate is increasing, the TU coincidence occurs at a faster rate and the rate of the sine/cosine pulse width signals is increased. When the machine movable member (included as part of or connected to the relatively movable member 312, FIG. 14) is at rest, TU coincidence occurs every 100 clock pulses. As a result, since a cycle is 2,000 clock pulses, counter 389 counts 20 times during one counting cycle of N-counter 302. However, when the machine member is moving, the n-counter 304 is changing counts so that each TU coincidence occurs at a different count depending on whether the n-counter 304 is counting up or down. For example, if the system is operating at a counting rate of 200KHz, and the counter is counting up, TU coincidence would occur each 105 clock pulses instead of each 100.

In toggling, or causing a change in the count of counter 389, NAND gate 390 receives one input from NAND gate 391 which itself receives inputs from the +TU line, from the clock (CK) line, and from the U/D$_N$ line inverted by NAND gate 393. NAND gate 390 also receives an input from the $\overline{Q}$ output of flip-flop 385.

Flip-flop 386 is driven by the $\overline{Q}$ output of flip-flop 387. The $\overline{Q}$ output of flip-flop 386 drives NAND gate 394. Flip-flop 387 is driven by the D stage of counter 389. The Q output of flip-flop 387 drives the A stage of counter 389 which provides an output to NAND gate 395.

As previously indicated, the $-n$ channel comprises similar circuitry for providing inputs to gates 394 and 395.

The output from NAND gate 395 drives inverting amplifier 396 for producing a rectangular wave signal having a pulse width proportional to the angle represented by the count in the n-counter 304. Gate 395 remains on for a period proportional to the count in the n-counter 304 and operates in a manner analogous to AND gate 92 as described in connection with FIG. 5. The signal from AND gate 395 and amplifier 396 are proportional to cos θ.

NAND gate 394 similarly remains on to produce a rectangular signal proportional to the angle represented by the count in the n-counter 304 in a manner analogous to AND gate 81 in FIG. 5. The output from NAND gate 394 passes through the sign reversing logic 397 to inverting amplifier 398 for the sine signal.

Sign reversing logic 397 comprises NAND gates 399, 400, 401, and 402 for inverting the sign of the rectangular wave signal from NAND gate 394. When switch 314 (see FIG. 13) is at relatively high potential, such a voltage is applied to the inputs of gates 399 and 401 for inverting the signal. As a result, the relative positive and negative directions of machine movement can be reversed. For example, if the switch 314 is open, position motion of the machine could be in a first direction, whereas, if the switch 314 is closed, the positive motion would be in the opposite direction.

In operation, when NAND gate 382' of the $-n$ channel detects coincidence between the reference count and the complement of the internal count, its output goes low. For the example, it is assumed that the n-counter 304 is counting down and the U/D$_N$ line is low.

When the output of gate 382' is low, after flip-flops 385', 386', and 387' had been cleared to a zero state, the output of NAND gate 388' is high and counter 389' is set to a count of 9 or one below its capacity, the D and A stages are set to logic one state, the B and C stages are logic zero.

During coincidence, the output of gate 383' is high and the output of gate 384' is low. Therefore, flip-flop 385' remains unchanged.

At the commencement of the next TU coincidence, approximately 100 clock pulses, or counts, following the $-n$ channel coincidence, NAND gate 384' is set high so that upon receipt of the next clock pulse (CK), flip-flop 385' complements changing its $\overline{Q}$ output from "1" to "0" thereby changing the gate 390' output from "0" to "1. On the next negative-going transition of the clock pulse line CK, as occurs (when the U/D$_N$ line is "0") at $-(+n+1)+100+1$ time (that is, at time $-n+100$), flip-flop 385' is reset changing its Q output from "0" to "1" thereby changing the NAND gate 390' output from "1" to "0". That "1" to "0" transition of NAND gate 390' adds a count of 1 to the count of 9 in the counter 12. As a result, the B, C, and D stages are set to logical zeros. The output from gate 382' is high since there is a lack of coincidence on the $-$Th and the $-$H lines. Since flip-lop 385' was interposed between gates 384' and 390', a one bit delay is incurred. The one bit delay converts the nine's complemented number, $-(n+1)$, into a ten's complement, $-n$. A similar delay may be inserted via flip-flop 385, into the $+n$ channel by removing flip-lop 385' from the $-n$ channel as will be described hereinafter.

Referring to FIG. 13 under the condition that U/D$_N$ is "1" and after termination of coincidence is detected by a positive-going transition from NAND gate 382' resulting from the inputs $-$TU, $-$H and $-$TH having been "1's", as occurs at the 9's complement of $+n$ time designated by time $-(n+1)$, the next stepping pulse transmitted by NAND gate 390', via NAND gate 391' occurs 100 clock pulses later. Accordingly, an expression for the time of the next stepping pulse applied to counter 12 after coincidence in the $-n$ channel is $-(n+1)+100$. Referring now to the $+n$ channel, with U/D$_N$ still remaining a "1", NAND gate 382 develops a coincidence output which terminates at $+n$. The next stepping pulse generated by NAND gate 390, via delay flip-flop 385, occurs 100 clock pulses later plus one more clock pulse period to account for the delay of flip-lop 385. Accordingly, an expression for the next stepping pulse time after termination of coincidence in the $+n$ channel, as detected by a positive-going output transition from NAND gate 382, is given by $+n+100+1$. The difference in time between the first stepping pulse after coincidence from NAND gate 390 and NAND gate 390', when the U/D$_N$ line is a "1", is given by $2(n+1)$.

Still referring to FIG. 13 under the condition that U/D$_N$ is "0", the delay in flip-flop 385 is removed from the $+n$ channel path of TU pulses allowing the TU pulses to be transmitted through NAND gate 391 to NAND gate 390. Simultaneously with the removal of the delay in flip-flop 385, flip-flop 385' is inserted in the −n channel path of −TU pulses. Accordingly, termination of coincidence occurs in the −n channel when the NAND gate 382' has a positive-going output which occurs at the 9's complement time −(n+1). The next stepping pulse generated by NAND gate 390' occurs 100 clock pulses later at the next −TU pulse as delayed one clock pulse period by flip-flop 385'. An expression, therefore, for the time of that next stepping pulse generated by NAND gate 390' is −(n+1)+1+100 or simply −n+100. In a similar fashion, an expression for the timing of the next stepping pulse generated by NAND gate 390, when $U/D_N$ is "0", after termination of coincidence is detected in the +n channel by NAND gate 382, is give by +n+100. The difference in times at which the NAND gates 390 and 390' deliver the next stepping pulses after coincidence to counters 11 and 12 is given by 2n.

The above explanation makes it clear that the FIG. 13 circuit presents a different input to counters 11 and 12 for the same value of n depending upon whether or not the $U/D_N$ line is a "1" or a "0" and which, of course, will cause a corresponding change in the output signals. The difference between the two conditions is exactly 2 (measured in clock-pulse-period units) which is equivalent to the smallest unit of change in the output signals from NAND gates 394 and 395.

This change in output dependent upon the $U/D_N$ level is useful in systems like that of FIGS. 13 and 14 which are designed to operate such that the error signal from data element 311, tends to be reduced to zero causing a change in the $U/D_N$ line. After the initial change in the $U/D_N$ line, the system operates in the opposite direction again tending to make the error signal reduce to zero until another change in the $U/D_N$ line occurs. This process of reducing toward zero from one direction, changing the $U/D_N$ line and thereafter reducing toward "0" in the opposite direction is essentially an oscillation about zero.

The different input to the counters 11 and 12 of FIG. 13 as a function of the $U/D_N$ "1" or "0" as discussed above is helpful in establishing about the error signal zero level in a manner which maintains system sensitivity high in the vicinity of the error zero level.

Turning to the output of counters 11 and 12 at the time when the D stage toggles, flip-flop 387' is set high and flip-flop 386' is set high. Five hundred counts following −TU coincidence, the D stage again changes from a logical one to a logical zero and flip-flop 387' is set low. As a result, the A stage of counter 389' is set low. Therefore, one input to NAND gate 395 is low and the output from inverting amplifier 396 is low. Previously, the inverting amplifier 396 was set high when the A stage of the counter 389 was set high. When both A stages were high, both inputs to gate 395 were high and the output from inverting amplifier 396 was high.

As shown in FIG. 13, NAND gate 394 receives inputs from $\overline{Q}$ output of flip-flop 386 and the Q output of flip-flop 386'. When $U/D_N$ is "0", the 386' Q output is set high at −n+100 when the 386 $\overline{Q}$ output from NAND gate 394 is set high. Subsequently, at +n+100, the 386 $\overline{Q}$ output is set low so that the output from NAND gate 394 is set low. Therefore, gate 394 is set low during the period from −n+100 to +n+100. Inverting amplifier 398 provides a high output during that period unless switch 314 is closed to reverse the polarity of the input signal to amplifier 398.

Figure 15:
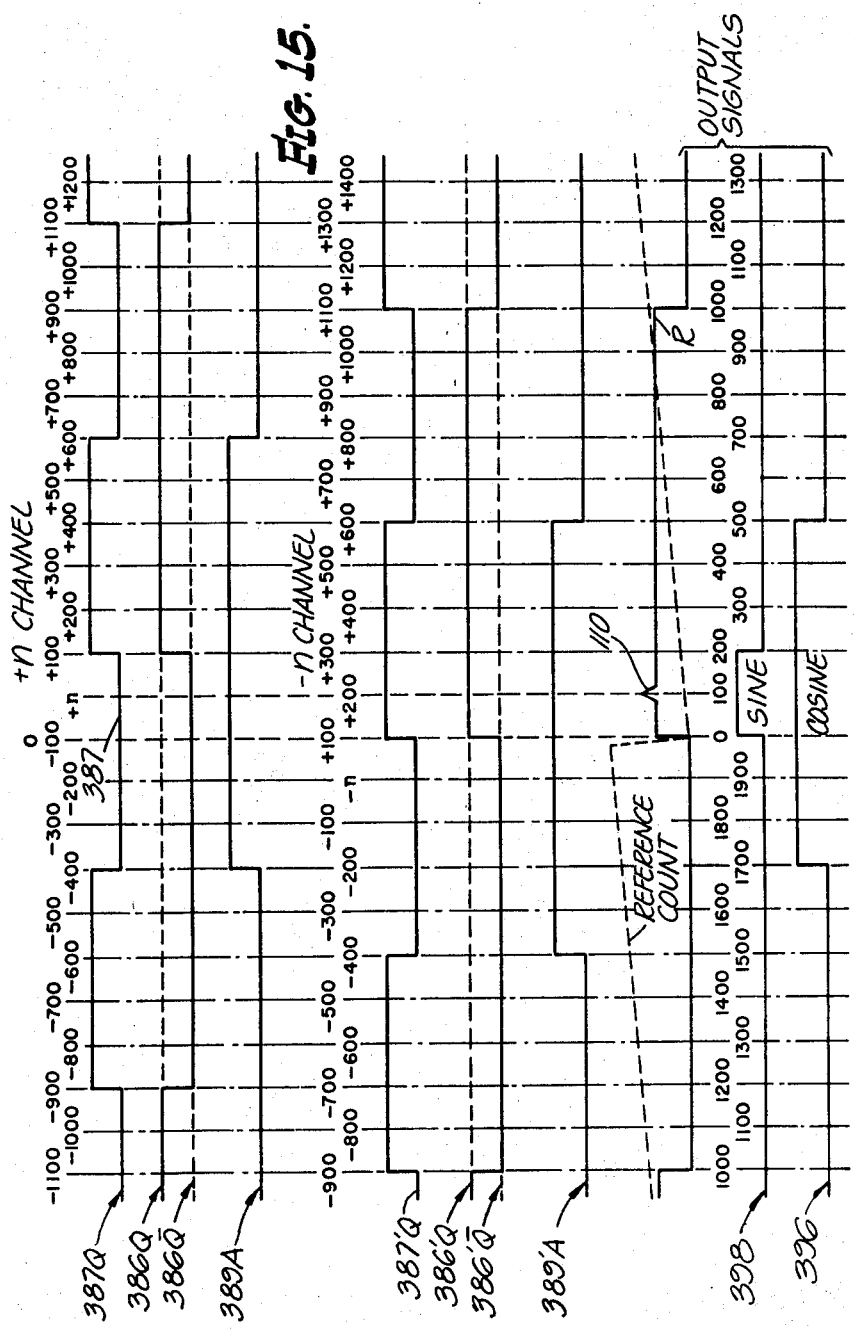
FIG. 15 depicts timing waveforms indicative of the operation of the FIGS. 13 and 14 converter.

The relationship of the output signals from flip-flops 386, 386', 387, 387' and from the A stages of the counters is shown more clearly in FIG. 15. The Q outputs from flip-flop 387 and 387' are shown because those signals are used in producing the cosine output signal. Similar, the $\overline{Q}$ and Q outputs of flip-flops 386 and 386', respectively, are shown because those signals are used in din producing the sine output signal. As indicated by the signals, inverting amplifier 398 for the sine signal turns "on", or is driven high when the Q output from flip-flop 386' goes high, and turns "off", or is driven low, when the $\overline{Q}$ output from the flip-flop 386 goes low, assuming that the reversing input from switch 314 is low, thereby causing the outputs of gates 394 and 402 to agree.

Amplifier 396 turns on, or is driven high, when the output of the A stage of counter 389 goes high and turns off or is driven low when the output from the A stage of counter 389' goes low.

The mid-points of both signals (sine and cosine) are, as shown in FIG. 15, equally displaced by 100 clock periods from zero reference position of reference signal R. The count (0–1,999) of the N-counter 302 is represented by the dashed signal superimposed over the reference signal.

The period during which amplifier 398 is on provides a rectangular signal which can be filtered to provide a sinusoidal signal having an amplitude proportional to the sine of the angle represented by the count in the n-counter 304. The same filtering technique can be applied to produce a sinusoidal signal having an amplitude proportional to the cosine of the angle. Filter 317, for the reset embodiment shown, is placed at the output of the data element 311, which is a position measuring device, instead of in each channel of the input. By varying the widths of the pulses in the sine and cosine waveforms 398 and 396, as when the count in the n-counter is varied, the amplitudes of the sinusoidal signals are correspondingly varied. For the particular example shown in FIG. 15, the angle is 18° for a count of 100.

By way of reviewing the operation of the counters in the reset embodiment of the present invention, NAND gate 390 is a source of stepping pulses of frequency MF for counter 11 and similarly, NAND gate 390' is a source of stepping pulses of frequency MF for counter 12. Counters 11 and 12 are each M-stage counters so that the output frequency from the NAND gate 394 and 395 is F. In the particular example of FIGS. 13 and 14, M is equal to 20 and the output frequency F is 2KHz. The frequency of the signals derived from NAND gates 390 and 390', therefore, must be and is 40KHz. Remembering that the clock 301 frequency, in FIG. 14, is 4MHz and remembering that the TU pulses as supplied to NAND gates 382, 383, 391, 382', 383' and 391' occur once for every 100 clock pulses, the frequency of TU and −TU pulses is (4MHz)/100 or 40 KHz. This 40KHz frequency of TU and −TU stepping pulses is transmitted to NAND gate 390 in the +n channel by NAND gate 391 if $U/D_N$ is a "0" or to NAND gate 390 via the one-pulse-delay route of flip-flop 385 if $U/D_N$ is a "1". In a similar manner, the 40KHz frequency of stepping pulses derived from the −TU signal is transmitted to the NAND gate 390' via NAND gate 391' if U/D$_N$ is a "1" or to NAND gate 390' via the one-pulse-delay route of flip-flop 385' whenever U/D$_N$ is "0".

Although the stepping pulse inputs from NAND gates 390 and 390' are both of frequency MF as explained, counters 11 and 12 are reset at different times through the action of NAND gates 388 and 388', respectively. Counter 12 is reset at the $-(n+1)$ coincidence and counter 11 is rest at the $+n$ coincidence and this resetting action establishes a digital count difference between the counters 11 and 12. Furthermore, the input stepping pulses of frequency MF are phase-shifted with respect to each other since the counter 11 stepping pulses are generated from the +TU coincidence pulses whereas the counter 12 stepping pulses are generated from the −TU coincidence pulses. This combination of phase-shifted stepping pulses coupled with an established count difference between the counts in counters 11 and 12 (as generated by the reset NAND gates 388 and 388') generates an input to the combining means 17 of FIG. 13 identical in nature and operation to the FIGS. 5 ad 9 counters 11 and 12 input to combining means 17 also in FIGS. 5 and 9.

RESET EMBODIMENT READOUT SYSTEM OPERATION

Referring to FIG. 14, the resolver 311 includes two relatively movable members 312 and 313. For convenience member 313 is assumed stationary while member 312 is assumed movable, but of course, either may be stationary or both may be movable. FIG. 14 comprises a readout system wherein external counter 320, the contents of which are displayed in display device 321, contains a digital count representative of the relative space positions of members 312 and 313. Assuming for the sake of explanation that counter 320 initially contains a "0" count indicating that member 312 is in a "0" position with respect to member 313, the member 312 is moved (by manual or automatic means not shown) to a selected position thereby causing an error signal to be generated as an output from member 313.

That error signal is amplified in amplifier 316, filtered in filter 317, phase detected in detector 318 to determine the plus or minus direction that member 312 was moved, and rectified in rectifier 319 to develop a signal indicative of the magnitude of the member 312 movement. The movement of the member 312 to the selected position causes the internal control logic 305 to generate RCT$_N$ pulses on line 478 which are provided both to the $n$-counter 304 and to the external counter 320. Those RCT$_N$ pulses cause counters 304 and 320 to be incremented or decremented depending on the "1" or "0" status of the U/D$_N$ line from internal control logic 305. The full details of the operation of the system like that of FIG. 14 are, of course, described in the above-identified application Ser. No. 809,533 which is hereby incorporated by reference in the present specification for the purpose of teaching such a system operation.

Continuing with a summary of FIG. 14 system operation at a time after member 312 has been moved to a selected position, the error signal from member 313 serves to produce digital RCT$_N$ pulses on line 478 for controlling the generation, in converter 174 of FIG. 14, of the sine and cosine signals on lines 336 and 337. Those sine and cosine signals are inputs to member 312 and change, as RCT$_N$ pulses are generated, in a direction tending to reduce the error signal from amplifier 316 to zero. The number of RCT$_N$ pulses required to reduce the magnitude, $Es$, of the error signal to zero become recorded in the external counter 320. That number in external counter 320 is displayed by display device 321 and gives a visual digital indication of the position of member 312, with respect to member 313.

Assuming that the direction of movement of member 312 to its selected position caused counter 304 to count up (that is, U/D$_N$ was "1") the error signal is continually reduced as RCT$_N$ pulses are generated until the error signal passes through null causing the phase detector 318 to reverse sign thereby causing the U/D$_N$ line to switch from "1" to "0".

As previously described, the system continuously oscillates about the null until member 312 is moved to some new selected position. The oscillation about the null is evidenced by an oscillation of the U/D$_N$ line. The oscillation of the U/D$_N$ line is detected in external control logic 309 which in turn functions to inhibit RCT$_N$ induced changes in counter 320 as long as the U/D$_N$ line oscillations continue. Since counter 320 does not oscillate the number displayed by display 321 does not oscillate. When member 312 is moved to a new selected position, the U/D$_N$ oscillations stop, the RCT$_N$ pulses again change the count in counter 320 until a new null is reached whereafter the U/D$_N$ oscillations again begin, RCT$_N$ pulses into counter 320 are again inhibited and the display 321 indicates a digital value representative of the new selected position.

FURTHER AND OTHER EMBODIMENTS

While the invention has been described in connection with the inhibit, symmetrical, and reset embodiments, those embodiments are merely intended as examples and not as limitations on the scope of the present invention.

For example, the preset invention can be embodied in a general purpose computer where the counters 11 and 12 take the form of general purpose registers, where the generation means 7 consists of various well known gates and controls associated with the computer's general purpose registers, where the control 4 includes the normal control circuitry of a computer which may include the programing, and where the logical combining means 17 includes the conventional logic performing circuitry in a computer. In view of the teaching within the present specification, such a general purpose computer embodiment can be readily implemented by those skilled in the art.

While the term "counters" has been used in connection with various circuits in this specification, it is, of course, intended that any equivalent circuitry, which has the capacity to register information, be within the scope of the invention. For example, rather than JK flip-flops, magnetic cores and other similar conventional bistable storage devices may be employed.

While the three embodiments previously described in detail were directed to a two-output converter, where the amplitudes of the fundamental frequency components of the converter output signals were proportional to the sine $\theta$ and cosine $\theta$, any other single or multi-phase system is within the spirit of the present invention. For example, FIG. 16 depicts a three-output logical combining means which may be employed in place of the two-output logical combining means 17 in any of the embodiments of the present invention.

Figure 16:
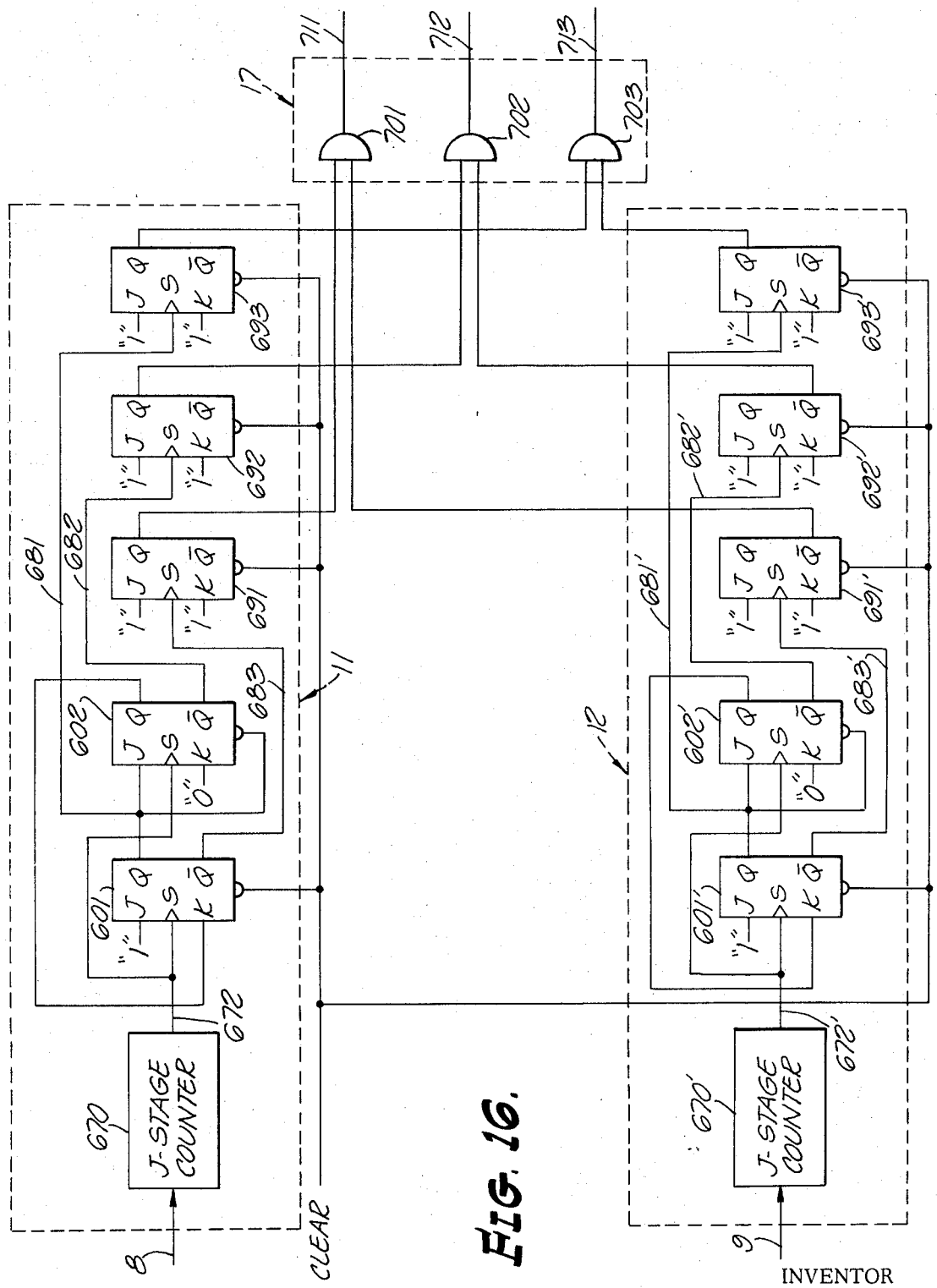
FIG. 16 depicts the details of a three-phase FIG. 2 combining means 17.
Figure 17:
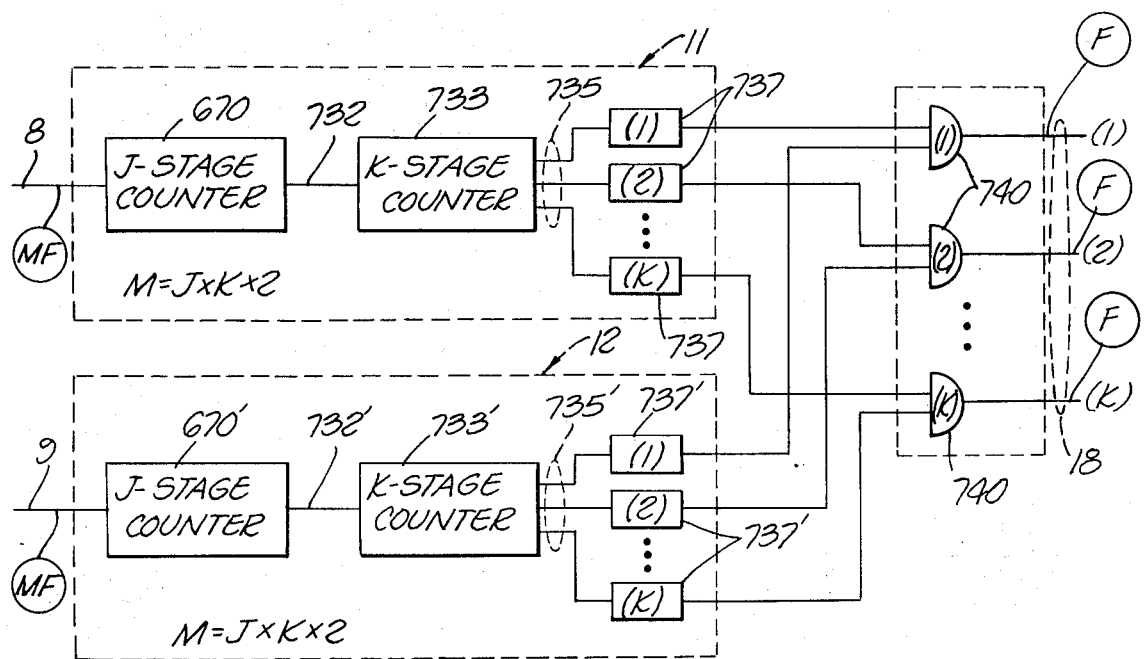
FIG. 17 depicts a K-phase combining means.

In FIG. 16, counters 11 and 12 are analogous to the counters 11 and 12 of FIG. 1. Counters 11 and 12 receive suitable inputs of frequency MF on lines 8 and 9 from a generation means 7 (not shown in FIG. 16) like any of those generation means described in connection with the FIG. 5, FIG. 9, and FIG. 14 embodiments. Counters 11 and 12 include first stages 670 and 670', respectively, of any desired count J. Counters 11 and 12 include the ternary counters consisting of JK flip-flops 601 and 602, and 601' and 602', respectively. Finally, counters 11 and 12 terminate in parallel binary counters 691, 692, and 693 and 691', 692', and 693', respectively. Those ternary counters function, in a conventional manner, to divide by three the frequency of the output pulses from stages 670 and 670' on lines 672 and 672', respectively. Those ternary counters form three output signals on lines 681, 682 and 683, and 681', 682', and 683' for counters 11 and 12, respectively. Each output signal on line 681, 682, and 683, has a frequency equal to one-third the input frequency on line 672, and those outputs each have a negative-going transition equally phase-shifted with respect to each other by 120°. Similarly, the outputs 681', 682' and 683', have negative-going transitions each phase-shifted by 120° with respect to each other and each has a frequency equal to one-third the frequency of the input on line 672'. Each of the outputs, 681, 682, and 683, is connected to the strobe input of a corresponding JK flip-flop 693, 692, and 691, with analogous connections and flip-flops for the primed numbers. Each pair of flip-flops, 691 and 691', 692 and 692', and 693 and 693', has appropriately selected outputs connected to AND gates 701, 702 and 703, respectively. The outputs from the AND gates 701, 702, and 703, on lines 711, 712, and 713, are pulse-width modulated signals each of which contains a fundamental frequency component proportional to a function of the difference in count between the counts in counters 11 and 12. For input signals of frequency MF on lines 8 and 9 where the total number of counts J times 3 times 2 for counters 11 and 12 totals, in each case, M, the output frequency on lines 711, 712, and 713 is F since MF divided by M is F.

Under the above conditions, the amplitudes of the fundamental frequency components of frequency F for the signals on lines 711, 712 and 713 are proportional to a sinusoidal function of a different constant angle plus $\theta$ or to sine $\theta$, sine ($\theta$ + 120°), sine ($\theta$ + 240°), respectively, where $\theta$ equals $(n/N)360$ degrees, where the difference in count between the two counters is proportional to $2n$, and where $n$ can assume values between 0 and N−1.

The operation of the FIG. 16 circuitry is analogous to that of the other converters of the present invention and hence, needs no further detailed explanation. Briefly, AND gates 701, 702 and 703 receive square wave input signals which are phase-shifted with respect to each other from the respective not-primed and prime flip-flops 691, 692 and 693 where the phase shift in those signals is proportional to the count difference between the counts in counters 11 and 12.

As is apparent from comparison of the three-output system of FIG. 16 with the two-output system of FIG. 5, for example, the next-to-last stage of the counter for a two-output system is binary while the next-to-last stage for a three-output system is ternary. By extending this principle, a four-output system can be readily derived using a four-stage counter, a five-output system using a five-stage counter, and so on. Such an extension is shown in FIG. 17 for a K-output system.

In FIG. 17, the J-stage counters 670 and 670' are identical to the like-numbered counters in FIG. 16 and serve the same function. The K-stage counters 733 an 733' are of length K and serve to divide the input signals on lines 732 and 732' by K while forming K output signals on each of the K set of lines 735 and 735'. The signals on lines 735 and 735' are 1/K the frequency of the input signals on lines 732 and 732'. The K output signals 735 and 735' are each connected to a different one of the K bistable stages 737 and 737'. The outputs from the K binary stages 737 and 737' are connected to the logical combining means 17 which includes K AND gates 740. Each one of the AND gates 740 is connected to one of the K binary stages 737 and one of the K binary stages 737'. Each of the AND gates 740 forms one of the K output signals on lines 18. Each of the signals on lines 18 is a pulse-width modulated signal having a fundamental frequency component proportional to a sinusoidal function of the angle $\theta$ where $\theta$ equals $(n/N)360$ degrees.

The FIG. 16 circuit is derived by letting K equal 3 in FIG. 17. Letting K equal 3, the FIG. 16 stages 691, 692 and 693 correspond to the three bistable stages 737 in FIG. 17. A corresponding correspondence between the primed numbered stages in FIGS. 16 and 17 also exists, of course.

The FIG. 17 circuitry corresponds to the counters 11 and 12 in FIG. 13 if K is allowed to equal 2. In FIG. 13, counter stages 389A and 386 correspond to the binary stages 737 in FIG. 17. In a similar manner, binary stages 389'A and 386' correspond to the binary stages 737' in FIG. 17. Similarly, counter stages 387 and 387' in FIG. 13 correspond to the K-stage counters 733 and 733', respectively, in FIG. 17. A further correspondence is found between the stages 389B, C and D and stages 389'B, C and D in FIG. 13 with the J-stage counters 670 and 670', respectively, in FIG. 17. When FIG. 17 corresponds to the FIG. 3 embodiment, the value of J equals 5, the value of K equals 2, and the binary stages 737 and 737', of course add an additional count of 2 so that a scale or count of 20 is obtained. Stated another way, stepping pulse inputs on lines 8 and 9 in FIG. 17 of frequency MF provide output signals on lines 18 of frequency F as long as the product of J × K × 2 is equal to M.

Figure 18:
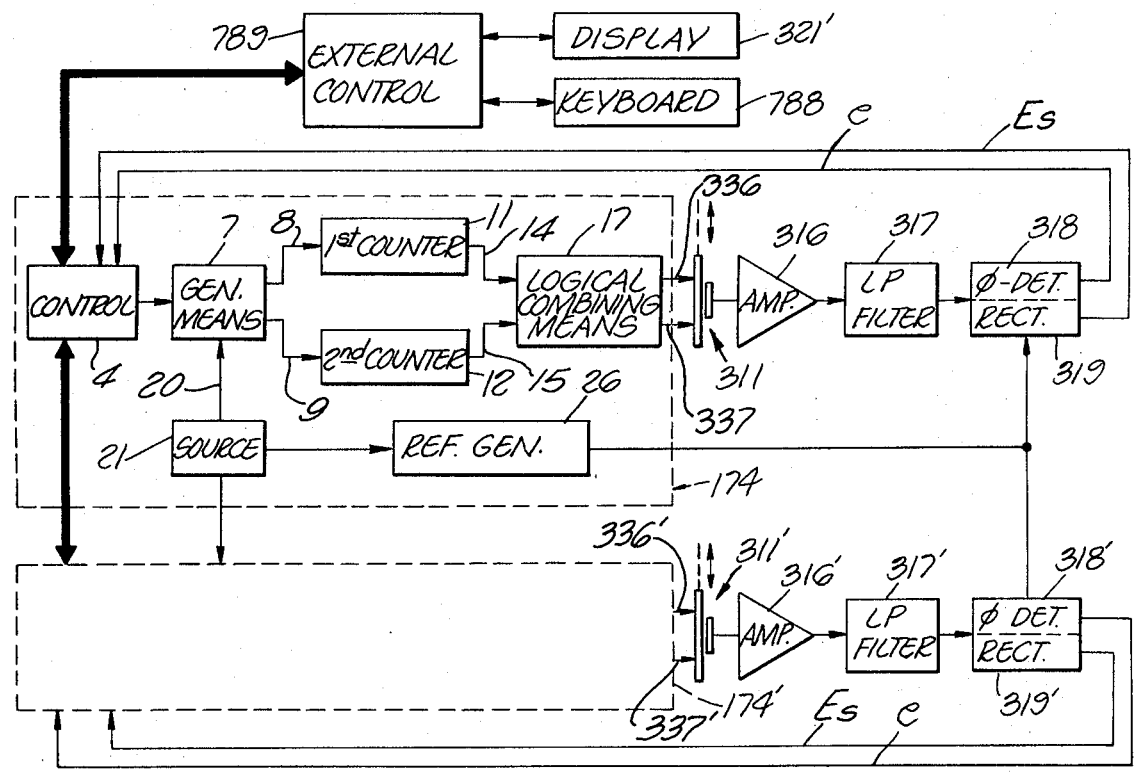
FIG. 18 depicts a plural axes system using a plurality of the FIG. 2 type converters in which the reference generator is shared.

In FIG. 18, two converters 174 and 174' like those of FIGS. 1 and 2 are connected in a plural axes readout system which is analogous to the single axis readout system of FIG. 14. In FIG. 18, the resolvers 311 and 311', the amplifiers 316 and 316', the low-pass filters 317 and 317', the phase-detectors 318 ad 318', and the rectifiers 319 and 319' correspond in connection and operation to the like-numbered devices (without any primes) in the FIG. 14 circuitry. The converters 174 and 174' within the dotted lines of FIG. 18 are analogous in function to the converter 174 in FIG. 14 (a portion of which is within the function generator of FIG. 13). Similarly, the converters 174 and 174' in FIG. 18 may be any of the converter embodiments of the present invention. The converter 174' employed for the second axis, associated with the resolver 311', is identical to the converter 174 in FIG. 18 with the exception that the source 21 and reference generator 26 is unnecessary in the converter 174' if the symmetrical embodiment of the present invention is employed since those elements may be shared as previously discussed. The external control 789 is analogous in function and operation to the external control logic 309 and external counter 320 in FIG. 14. Similarly, display 321 in FIG. 18 is analogous to the display 321 in FIG. 14. Keyboard 788 and other similar input-output devices may be connected to the external control 789 in FIG. 18 as desired. External control 789 is connected to the control 4 in converter 174. The operation of the external control logic with the control 4 in FIG. 18 is analogous to the same operation in FIG. 14, all of which is described in more detail in the above-identified application Serial No. 809,533 is incorporated by reference herein for the purpose of teaching such a system of operation.

The apparatus of FIG. 18 functions as a two axes system where resolver 311 is associated with one axis and resolver 311' is associated with the other axis. Of course, a third axis or additional axes could be established by adding additional resolvers, converters and other circuit elements like those identified with prime numbers all of which might share the source 21 and reference generator 26 from the converter 174.

In operation, (referring to FIG. 18) the movable member of resolver 311 would be moved to some selected position. Similarly, the movable member of resolver 311' might also be moved to some selected position. For example, both resolvers 311 and 311' can be attached to the same member and detect motion in orthogonal directions. In such an orthogonal relationship, the error signals from data elements 311 and 311' each control the respective converters 174 and 174' to develop the digital outputs to external control 789 which are displayed on display 321. Display 321 gives a separate digital indication of the position for both the 311 axis and the 311' axis directions. Alternatively, one combined digital indication of the member may be formed using techniques well known in the art.

While the converters and systems of the present invention have been described with reference to a readout system such as shown in FIG. 14 and the plural axes readout system of FIG. 18, the converters of the present invention may be employed in other controlling and measuring servo systems such as those specifically mentioned in the above-identified cross-reference applications Ser. No. 814,670 and Serial No. 854,816 (D-378 CIP).

What is claimed is:

1. A system responsive to the relative space position of first and second relatively movable members of a position measuring device, said members being inductively related so as to form an output error signal as a function of a relative space position of said relatively movable members and as a function of analog input signals to said position measuring device, said system comprising,
   control means responsive to said error signal for controlling a digital count which defines the magnitude of a digital number representative of the relative space position of said relatively movable members,
   a source of pulses,
   first counter means and second counter means each operative to be stepped, by stepping pulses having a timed relation with the pulses derived from said source, cyclically through a count range,
   generation means responsive to said control means for generating a digital count difference between the counts in said first and second counter means where said count difference is proportional to the digital magnitude of said number, and
   first and second means, each for logically combining signals from both said counter means to generate one of said input signals, each of said input signals having an analog component proportional to a function of said digital counter difference.

2. A system responsive to the relative space position of first and second relatively movable members of a position measuring device, said members being inductively related so as to form an analog output error signal as a function of the relative space position of said members and as a function of first and second input signals to said position measuring device, said system comprising,
   control means responsive to said error signal for controlling a digital count which defines the magnitude of a digital number $n$ representative of the relative space position of said relatively movable members,
   a source of pulses having a frequency NF,
   first counter means and second counter means each operative to be stepped, by stepping pulses having a timed relation to the pulses of said source, cyclically through a count range proportional to N,
   generation means responsive to said control means for generating a digital count difference between the counts in said first and said second counter means where said count difference is proportional to $n$,
   means for logically combining signals from both said counter means so as to generate said input signals, said first input signal having an analog component of frequency F proportional to sine $\theta$ and said second input signal having an analog component of frequency F proportional to cosine $\theta$ where $\theta$ equals $360(n/N)$ degrees, and
   a reference counter operative to be stepped by stepping pulses having a timed relation to the pulses of said source, said reference counter maintaining a count representing a number midway between the numbers represented by the counts in said first and second counter means and generating a reference signal of frequency F thereby providing a reference for determining the signs of said first and second input signals.

3. The apparatus of claim 2 wherein said output error signal is phase-detected to form a first system signal indicative of the direction from null of the displacement of said first and second relatively movable members, wherein said output error signal is rectified to form a second system signal proportional to the magnitude of the displacement from null of said first and second relatively movable members, and wherein said control means further includes, strobe generation means for generating strobe pulses, null crossover detector means connected to receive said first system signal and connected to said strobe generation means, said detector means operative to sample said first system signal, only after receipt of each one of said strobe pulses, so as to generate a first binary level when sampling indicates displacement of said first and second relatively movable members in one direction and to generate a second binary level when the sampling indicates displacement of said relatively movable members in the opposite direction.

4. The apparatus of claim 3 wherein said control means further includes, pulse rate generator means, connected to receive said second system signal, for generating operating pulses having a frequency related to the magnitude of said second system signal.

5. The apparatus of claim 4 wherein said strobe generation means includes, inhibit means connected to said pulse rate generator means for inhibiting said strobe generation means from generating said strobe pulses at any time when a pulse from said pulse rate generator means is present.

6. The apparatus of claim 4 wherein said pulse rate generator means includes, a variable frequency oscillator means for generating oscillator pulses variable over a frequency range, substantially including the range from 500 to 500KHz, as a function of the magnitude of said second system signal, and timing circuitry means connected to said source and connected to said variable frequency oscillator for generating one of said operating pulses for each one of said oscillator pulses such that each one of said operating pulses has a timed relation with a pulse from said source.

7. The apparatus of claim 4 wherein said pulse rate generator means includes, a variable frequency oscillator, asynchronous with respect to said source, for generating oscillator pulses, variable over a first frequency range, as a function of the magnitude of said second system signal, means for synchronously deriving first pulses having a constant frequency and having a timed relation to said input signals, means for combining said oscillator pulses and said first pulses for generating said operating pulses whereby said operating pulses are substantially said constant frequency when the magnitude of said second system signal indicates that said first and second relatively movable members of said position measuring device are in the vicinity of the null position, and wherein, said strobe generation means generates one of said strobe pulses for each one of said operating pulses.

8. The apparatus of claim 4 wherein the number of said operating pulses supplied to said generation means equals $n$ whereby said operating pulses generate said digital count difference between the counts in said first and second counter means.

9. The apparatus of claim 8 wherein said first binary level from said null crossover detector means causes said operating pulses to generate a count difference between the counts in said first and second counter means in one direction and wherein said second binary level from said null crossover detector means causes said operating pulses to generate a count difference between the counts in said first and second counter means in the opposite direction.

10. The apparatus of claim 9 wherein said null crossover detector includes, a two stage shift register stepped by said strobe pulses for recording the status of said first system signal each time one of said strobe pulses is received, external generator means, connected to said shift register means, for generating an inhibit signal when said shift register stages are not identical, said external generating including means responsive to said inhibit signal for inhibiting transmission of said operating pulses.

11. A plural axes system responsive to the position indications of first and second position measuring devices, one for each of two axes, said first position measuring device comprising relatively movable first and second members inductively related to form an output first error signal as a function of the relative space position of said first and second members and as a function of first analog input signals to said first position measuring device, said second position measuring device comprising relatively movable third and fourth members inductively related to form an output second error signal as a function of the relative space position of said third and fourth members and as a function of second analog input signals to said second position measuring device, said system comprising, first and second control means responsive to said first and second error signals, respectively, for controlling digital counts which define the digital magnitude of first and second numbers, respectively, representative of the relative space position of said first and second members and of said third and fourth members, respectively, a source of pulses, first and second counter means and third and fourth counter means where each counter means is operative to be stepped, by stepping pulses having a timed relation to the pulses of said source, cyclically through a count range, first and second generation means responsive to said first and second control means, respectively, for generating first and second digital count differences, respectively, between the counts in said first and second counter means and between the counts in said third and fourth counter means, respectively, where said first and second count differences are proportional to the digital magnitude of said first and second numbers, respectively, first and second combining means for logically combining signals from said first and second counter means and from said third and fourth counter means, respectively, so as to generate said first and second input signals, respectively, each of said first input signals having an analog component proportional to a function of said first digital count difference and each of said second input signals having an analog component proportional to a function of said second digital count difference, and a reference counter operative to be stepped by stepping pulses synchronously derived from said source, said reference counter maintaining a count representing a number midway between numbers represented by the counts in said first and second counter means and midway between numbers represented by the counts in said third and fourth counter means.

12. A plural axes system responsive to the position indications of first and second position measuring devices, one for each of two axes, said first position measuring device comprising relatively movable first and second members inductively related to form an output first error signal as a function of the relative space position of said first and second members and as a function of first analog input signals to said first position measuring device, said second position measuring device comprising relatively movable third and fourth members inductively related to form an output second error signal as a function of the relative space position of said third and fourth members and as a function of said second analog input signals to said second position measuring device, said system comprising, first and second control means responsive to said first and second error signals, respectively, for controlling digital counts which define the digital magnitude of a first number $n1$ and of a second number $n2$, respectively, wherein $n1$ is representative of the relative space position of said first and second members and wherein $n2$ is representative of the relative space position of said third and fourth members, respectively, a source of pulses having a frequency NF, first and second counter means and third and fourth counter means where each counter means is operative to be stepped, by stepping pulses having a timed relation to the pulses of said source, cyclically through a count range proportional to N, first and second generation means responsive to said first and second control means, respectively, for generating first and second digital count differences, respectively, between the counts in said first and second counter means and between the counts in said third and fourth counter means, respectively, where said first and second count differences are proportional to $n1$ and $n2$, respectively, first and second combining means for logically combining signals from said first and second counter means and from said third and fourth counter means, respectively, so as to generate said first and second input signals, respectively, each of said first input signals having an analog component of frequency F proportional to a sinusoidal function of $\theta 1$ where $\theta 1$ equals $360(n1/N)$ degrees and each of said second input signals having an analog component of frequency F proportional to a sinusoidal function of $\theta 2$ where $\theta 2$ equals $360(n2/N)$ degrees, and a reference counter operative to be stepped, by stepping pulses synchronously derived from said source, said reference counter maintaining a count representing a number midway between the numbers represented by the counts in said first and second counter means and midway between the numbers represented by the counts in said third and fourth counter means.

* * * * *